US009822642B2

(12) United States Patent
Anderson et al.

(10) Patent No.: US 9,822,642 B2
(45) Date of Patent: *Nov. 21, 2017

(54) ROTARY MACHINE

(71) Applicant: Lumenium LLC, Warrenton, VA (US)

(72) Inventors: William Anderson, Warrenton, VA (US); Trent Lukaczyk, Warrenton, VA (US); William Lukaczyk, Warrenton, VA (US); Riccardo Meldolesi, West Sussex (GB); Clive B. Lacy, West Sussex (GB)

(73) Assignee: Lumenium LLC, Fredericksburg, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/060,355

(22) Filed: Mar. 3, 2016

(65) Prior Publication Data

US 2017/0058673 A1 Mar. 2, 2017

Related U.S. Application Data

(63) Continuation of application No. 14/533,959, filed on Nov. 5, 2014, now Pat. No. 9,309,765, which is a (Continued)

(51) Int. Cl.
*F01C 1/04* (2006.01)
*B64D 27/16* (2006.01)
(Continued)

(52) U.S. Cl.
CPC ............. *F01C 1/04* (2013.01); *B64D 27/16* (2013.01); *F01C 21/001* (2013.01); (Continued)

(58) Field of Classification Search
CPC ........ F01C 1/04; F01C 21/001; F01C 21/008; F01C 21/02; F01C 21/06; F01C 21/08; (Continued)

(56) References Cited

U.S. PATENT DOCUMENTS 396,176 A 1/1889 Simpson
613,345 A 11/1898 White
(Continued)

FOREIGN PATENT DOCUMENTS

DE 2853930 A1 6/1980
DE 3236811 A1 5/1984
(Continued)

OTHER PUBLICATIONS

U.S. Non-Final Office Action issued in related U.S. Appl. No. 13/868,359, dated Jul. 26, 2013.
(Continued)

*Primary Examiner* — Grant Moubry
(74) *Attorney, Agent, or Firm* — Crawford Maunu PLLC

(57) ABSTRACT

The disclosure provides rotary machines that include, in one embodiment, a rotatable shaft defining a central axis A, the shaft having a first end and a second end. The shaft can have an elongate first island disposed thereon. The first island can have a body with a volume generally defined between front and rear surfaces that are spaced apart. The front and rear surfaces can lie in a plane parallel to a radial axis R. The perimeters of the front and rear surfaces can define a curved perimeter surface therebetween. The disclosure further provides embodiments having stationary islands and casings that rotate about the island.

22 Claims, 23 Drawing Sheets

Related U.S. Application Data continuation of application No. PCT/US2014/056383, filed on Sep. 18, 2014.

(60) Provisional application No. 61/879,628, filed on Sep. 18, 2013.

(51) Int. Cl.

| | | |
|---|---|---|
| *F02B 53/12* | (2006.01) | |
| *F02B 53/14* | (2006.01) | |
| *F01C 21/00* | (2006.01) | |
| *F01C 21/08* | (2006.01) | |
| *F04C 2/04* | (2006.01) | |
| *F01C 21/02* | (2006.01) | |
| *F01C 21/06* | (2006.01) | |
| *F02B 53/06* | (2006.01) | |
| *F02B 55/14* | (2006.01) | |
| *F01C 21/10* | (2006.01) | |
| *F01D 5/12* | (2006.01) | |
| *F04D 29/38* | (2006.01) | |

(52) U.S. Cl.
CPC ............ *F01C 21/008* (2013.01); *F01C 21/02* (2013.01); *F01C 21/06* (2013.01); *F01C 21/08* (2013.01); *F01C 21/0809* (2013.01); *F01C 21/104* (2013.01); *F01D 5/12* (2013.01); *F02B 53/06* (2013.01); *F02B 53/12* (2013.01); *F02B 53/14* (2013.01); *F02B 55/14* (2013.01); *F04C 2/04* (2013.01); *F04D 29/38* (2013.01); *Y02T 10/17* (2013.01)

(58) Field of Classification Search
CPC . F01C 21/004; F16M 1/04; F04C 2/00; F04C 2/04; F04C 2/22; F02B 53/06; F02B 53/00; F02B 53/12; F02B 53/14; F02B 55/08; F02B 55/16; F01D 5/12; B64D 27/16
USPC ....... 123/228, 229, 230, 237, 241, 242, 244, 123/248; 418/142, 160, 225, 237, 238, 418/242, 248, 250
See application file for complete search history.

(56) References Cited

U.S. PATENT DOCUMENTS

| | | |
|---|---|---|
| 777,692 A | 12/1904 | Phifer |
| 2,277,225 A | 3/1942 | Green |
| 2,919,062 A | 12/1959 | Tryhorn |
| 3,186,385 A | 6/1965 | Walker |
| 3,187,507 A | 6/1965 | Artajo |
| 3,245,389 A | 4/1966 | Kort |
| 3,259,113 A | 7/1966 | Hamada |
| 3,289,654 A | 12/1966 | Geiger |
| 3,295,505 A | 1/1967 | Jordan |
| 3,302,870 A | 2/1967 | Schell |
| 3,405,692 A | 10/1968 | Paschke |
| 3,636,930 A | 1/1972 | Okada |
| 3,884,600 A | 5/1975 | Gray |
| 3,936,250 A | 2/1976 | Mrlik |
| 3,981,645 A | 9/1976 | Herzner |
| 4,055,156 A | 10/1977 | Salguero |
| 4,144,866 A | 3/1979 | Hakner |
| 4,850,447 A | 7/1989 | Hirakushi |
| 5,380,177 A | 1/1995 | Leroy et al. |
| 5,540,199 A | 7/1996 | Penn |
| 5,681,157 A | 10/1997 | Wen-Ming |
| 6,120,272 A | 9/2000 | Gillardo |
| 6,129,068 A | 10/2000 | Wingate, Jr. |
| 6,672,274 B2 * | 1/2004 | Winterpacht ............. F01C 1/20 123/231 |
| 6,758,188 B2 | 7/2004 | Woolridge |
| 7,051,698 B2 | 5/2006 | Ollis |
| 7,185,625 B1 * | 3/2007 | Guan ........................ F01C 1/20 123/204 |
| 7,458,791 B2 | 12/2008 | Radziwill |
| 7,621,255 B2 | 11/2009 | Bowley |
| 8,607,762 B2 * | 12/2013 | Wooldridge ............ F01C 1/104 123/228 |
| 8,733,317 B2 | 5/2014 | Herbruck |
| 2003/0188711 A1 | 10/2003 | Chou |
| 2004/0011320 A1 | 1/2004 | Woodridge |
| 2010/0242897 A1 | 9/2010 | Woolridge |
| 2012/0031369 A1 | 2/2012 | Ki |

FOREIGN PATENT DOCUMENTS

| | | |
|---|---|---|
| EP | 1534943 | 1/2004 |
| FR | 2250892 A1 | 6/1975 |
| IN | 255824 A1 | 3/2013 |
| JP | 47-16570 | 5/1972 |
| JP | 56-18772 B1 | 5/1981 |
| JP | 61-210228 A | 9/1986 |
| JP | 63-065665 A | 3/1988 |
| JP | 06-329675 A | 11/1994 |
| JP | 2002-188454 A | 7/2002 |
| JP | 4763829 B2 | 8/2011 |
| WO | 02/052125 A1 | 7/2002 |
| WO | 2004/007926 A1 | 1/2004 |
| WO | 2010/111557 A2 | 9/2010 |
| WO | 2010/128776 A2 | 11/2010 |

OTHER PUBLICATIONS

U.S. Final Office Action issued in related U.S. Appl. No. 13/868,359, dated Dec. 16, 2013.
International Search Report in related international application No. PCT/US2003/014906, dated Aug. 7, 2003.
International Preliminary Examination Report in related international application No. PCT/US2003/014906, dated Dec. 20, 2004.
Supplementary European Search Report in related European application No. 03731157, dated Jul. 6, 2009.
Decision of Refusal in related JP patent application No. 2004-521437, dated Aug. 25, 2009.
European Communication pursuant to Article 94(3) EPC in related EP patent application No. EP 03731157.8, dated Oct. 21, 2009.
Notice of Office Action in related Korean application No. 7021723/2004, dated May 11, 2010.
First Examination Report in related Indian patent application 2959/CHENP/2004 (now Patent No. 255824), dated Jan. 23, 2012.
International Search Report in related international application No. PCT/US2010/028754, dated Mar. 26, 2012.
International Preliminary Report on Patentability and Written Opinion in related international application No. PCT/US2010/028754, dated Apr. 17, 2012.
U.S. Non-Final Office Action issued in related U.S. Appl. No. 12/732,160, dated Nov. 23, 2012.
U.S. Final Office Action issued in related U.S. Appl. No. 12/732,160, dated Mar. 27, 2013.
Notice of Reasons for Rejection in related JP patent application No. 2004-521437, dated Dec. 2, 2008.
International Preliminary Report on Patentability in related international application No. PCT/US2013/030649, dated Sep. 16, 2014.
Written Opinion of the International Searching Authority in related international application No. PCT/US2013/030649, dated Aug. 15, 2013.
EPO. Supplementary European Search Report for related European Patent Application No. 14845804.5, 1 sheet (dated Jul. 19, 2017).

\* cited by examiner

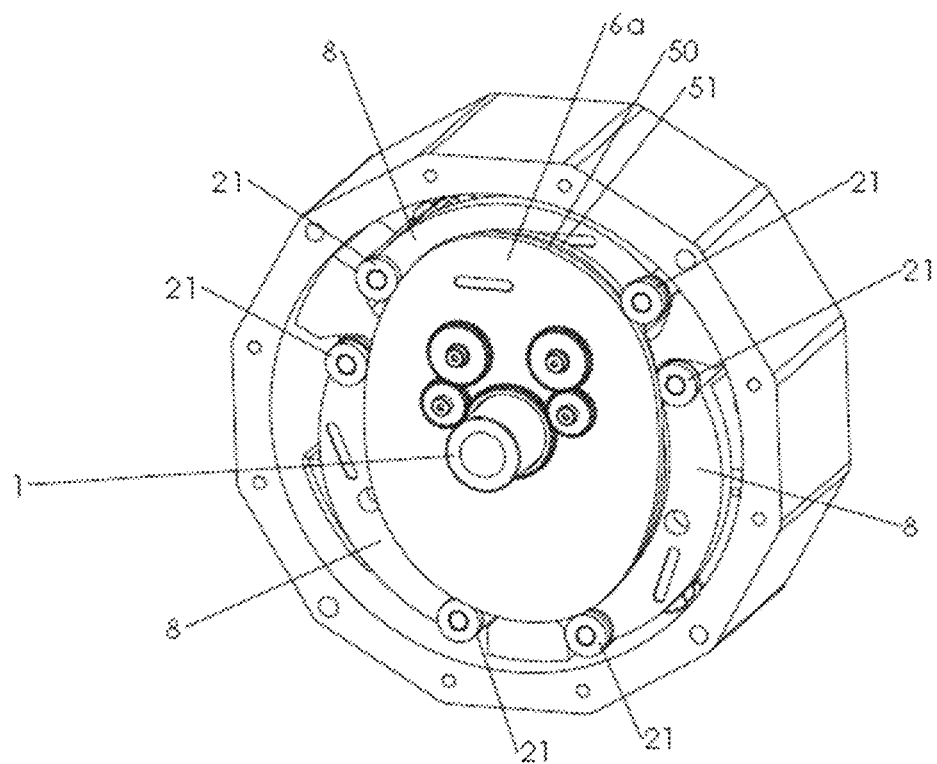
FIGURE 5
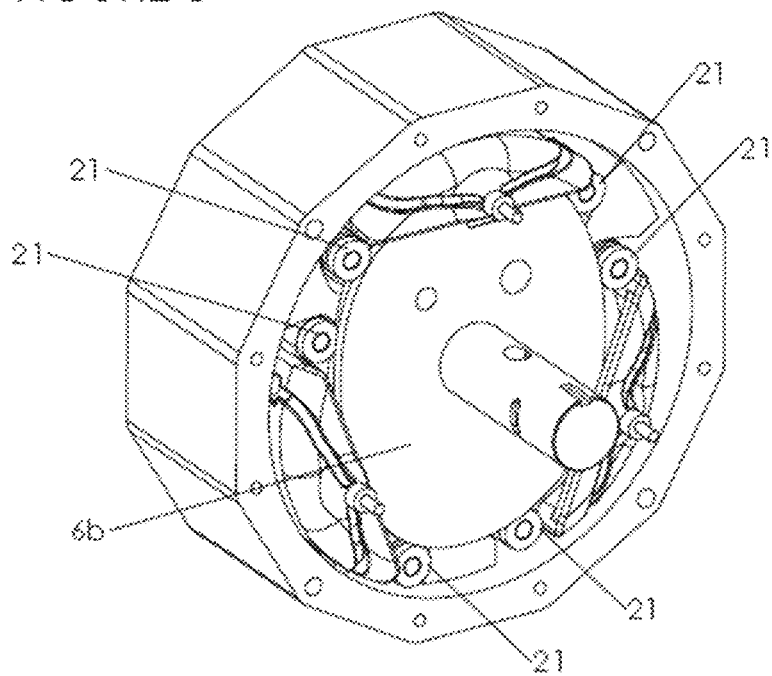

Top View

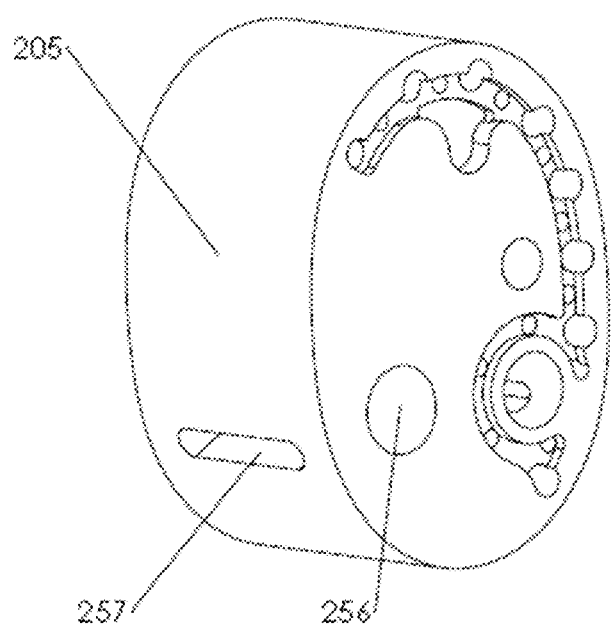
Figure 19a
Figure 19
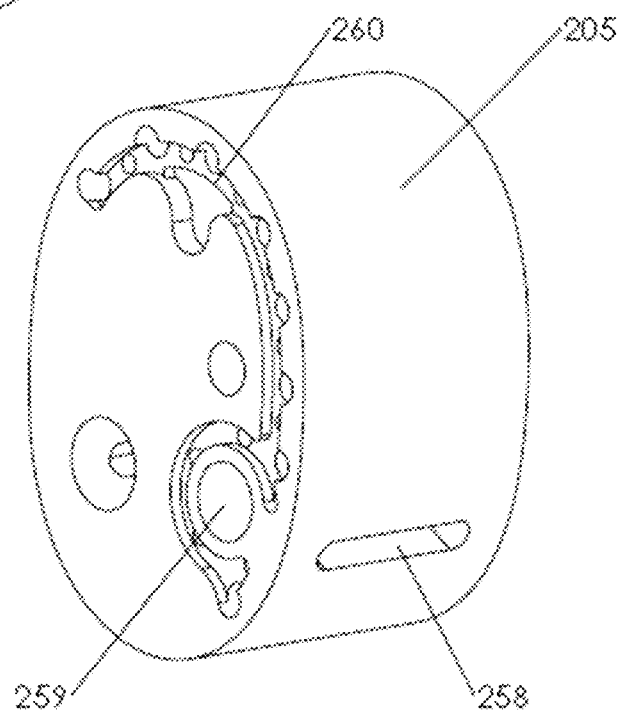
Figure 19b

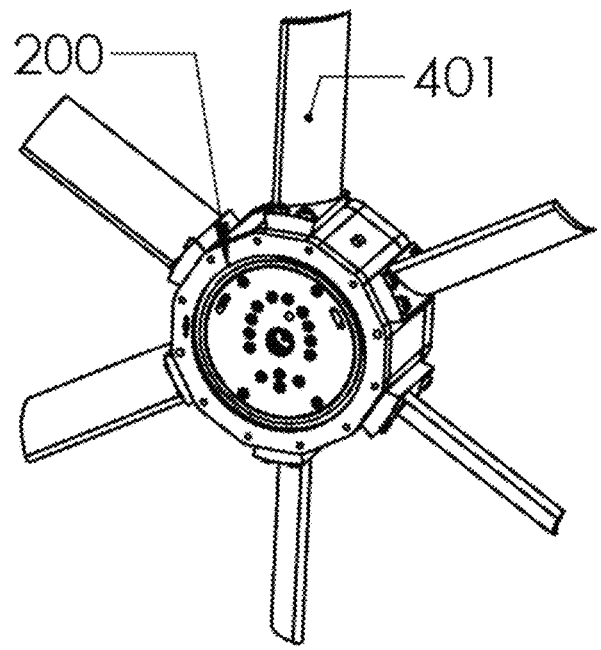
Figure 21a
Figure 21
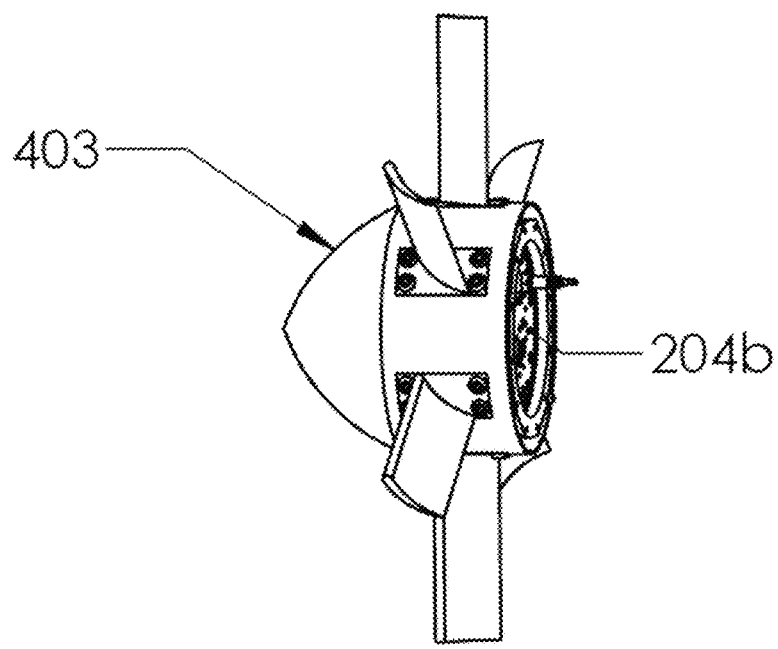
Figure 21b

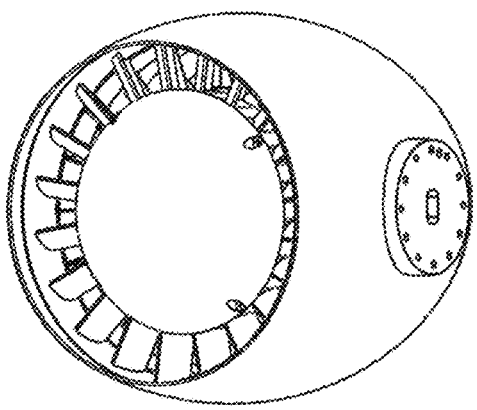
Figure 23A
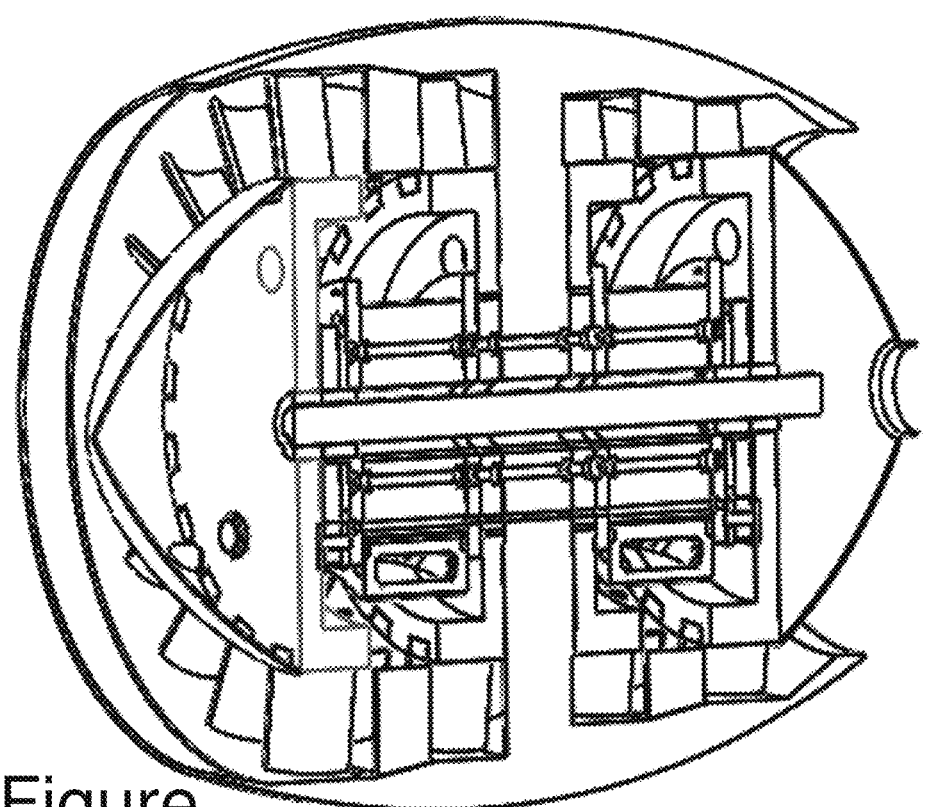
Figure 23B
Figure 23

ROTARY MACHINE

CROSS-REFERENCE TO RELATED APPLICATIONS

This patent application claims the benefit of priority to and is a continuation of U.S. patent application Ser. No. 14/533,959, filed on Nov. 5, 2014, which in turn claims the benefit of priority to and is a continuation of International Patent Application No. PCT/US14/56383, filed Sep. 18, 2014, which in turn claims the benefit of priority to U.S. Provisional Patent Application Ser. No. 61/879,628, filed Sep. 18, 2013. This patent application is also related to International Patent Application No. PCT/US13/30649, filed Mar. 13, 2013, which in turn claims the benefit of priority to U.S. Provisional Patent Application Ser. No. 61/697,481, filed Sep. 6, 2012, and U.S. Provisional Patent Application Ser. No. 61/610,781, filed Mar. 14, 2012. Each of the aforementioned patent applications is incorporated by reference herein in its entirety for any purpose whatsoever.

BACKGROUND

U.S. Pat. No. 6,758,188, entitled "Continuous Torque Inverse Displacement Asymmetric Rotary Engine", the disclosure of which is incorporated herein by reference in its entirety, discloses an Inverse Displacement Asymmetric Rotary (IDAR) engine. The engine includes an inner chamber wall, an outer chamber wall, and a movable contour. U.S. patent application Ser. No. 12/732,160, filed Mar. 25, 2010, which is also incorporated by reference herein in its entirety, presents improved embodiments vis-à-vis the embodiments of U.S. Pat. No. 6,758,188. The present disclosure provides significant improvements over these embodiments, as described herein.

SUMMARY

Some of the disclosed embodiments improve upon and add to embodiments described in U.S. patent application Ser. No. 13/868,359, filed Apr. 23, 2013. In some aspects, the present disclosure provides the following improvements over the embodiments in that application:

Lower friction and better working volume sealing can be achieved by using wheels with "frictionless" bearings and cam profiles to control the motion of contours.

Improved system for conducting high voltage energy to sparkplug.

Improved intake path down the center of shaft to reduce flow resistance and leakage while also believed to increase power.

Improved exhaust path down center of shaft to reduce back pressure

Valves in intake and exhaust to control gas flow timing

Integral fluid cooling passage ways

Rotary fluid couplings for cooling fluid and exhaust flow

Improved geometry for mitigating oil consumption

The disclosed embodiments describe aspects of a rotary machine used to combust fuel-air mixtures thereby converting chemical energy to rotational kinetic energy, or to act as a pump and/or compressed gas driven engine. A central feature of the disclosed embodiments is a formation of a working volume by the interaction of a convex surface of a rounded, symmetric or asymmetric rotating island, a reciprocating concave part or "contour," and front and rear side plates.

In other aspects, the disclosure provides an embodiment of a rotary machine having an island and side plates that are "fixed" and do not rotate about a central axis of the machine. Instead, the contours are attached to a housing or case (or ring), wherein the contours and the housing, case or ring rotate about the island. A plurality of (e.g., two) large bearings (e.g., either ball or thin film) support the rotating assembly on the fixed center assembly. Reciprocation of the contours can be guided by a sliding shoe in cam grove in the side plates which is lubricated by an oil film.

Power takeoff of this embodiment can be executed, for example, by attaching a shaft to a rotating power wheel shown on the front of the engine, or if desired by taking power off of the rotating case/ring itself. For example, in one embodiment, permanent magnets can be attached to an outer circumferential surface of the ring to form a rotor, and the rotor including the engine can be disposed within the stator field coils of a generator for a fully integrated generator/hybrid.

In accordance with further aspects, the embodiment can be provided with a notched plate near the rear of the engine to facilitate timing the spark. The combustion cycle can be either spark ignited ("SI", e.g., with a side spark plug) or compression ignited ("CI", e.g., with side fuel injection). Induction and exhaust can be through ports on the island as with the first embodiment, but through the rear plate rather than the shaft of the engine. Similarly, cooling can be effectuated in a manner similar to the first embodiment, but with fluids being directed into and out of the rear plate of the rotary machine instead of the shaft.

In further accordance with the disclosure, a rotary machine is provided including a rotatable shaft defining a central axis A, the shaft having a first end and a second end, the shaft having an elongate first island disposed thereon, the first island having a body with a volume generally defined between front and rear surfaces that are spaced apart along the rotatable shaft, the front and rear surfaces lying in a plane parallel to a radial axis R, the front and rear surfaces having a rounded, non-circular shape, the perimeters of the front and rear surfaces defining a curved perimeter surface therebetween. The first island can define a plurality of valve cavities therein for receiving rotatable valves. The rotary machine can further include a front side plate disposed adjacent to the front surface of the first island, and a rear side plate disposed adjacent to the rear surface of the first island. The rotary machine can further include one or more (e.g., two, three, or four) contour assemblies disposed between the front side plate and the rear side plate, the contour assembly (ies) being defined by a pair of opposed outwardly facing arcuately shaped front and rear surfaces that are connected by a concave inwardly facing surface. The concave inwardly facing surface of the contour assembly faces the curved perimeter surface of the first island. The concave inwardly facing surface and the curved perimeter surface of the island and the front side plate and rear side plate cooperate to form a working volume. The rotatable shaft and first island are preferably configured to rotate with respect to the first contour assembly. The rotary machine can further include a plurality of rotatable valves disposed in the valve cavities defined in the island. The rotatable valves can be configured to rotate within the valve cavities when the island rotates with respect to the first contour assembly about the central axis.

In some embodiments, the contour can include a spark plug connected to a conductor that passes through a central portion of a wrist pin upon which the contour is mounted. If desired the rotatable shaft can define at least one internal working fluid passageway therethrough for transporting at least one of intake air and exhaust. If desired, the at least one internal working fluid passageway can turn out radially from a central passage in a location where the rotatable shaft and island overlap. In various implementations, the at least one internal working fluid passageway can intersect at least one of the valve cavities. If desired, the at least one internal working fluid passageway can end at a port opening defined on the surface of the island.

In various implementations, the one or more islands (if more than one is provided) can each define therein an intake valve cavity and an exhaust valve cavity. If desired, the island(s) define(s) therein a plurality of intake valve cavities and a plurality of exhaust valve cavities, such as two intake valve cavities and two exhaust valve cavities. If desired, the rotatable valves can be configured to rotate within the valve cavities via a geared connection with a drive gear disposed on a housing of the rotary machine. The geared connection can be direct, or include one or more intermediate members, such as idler gear(s), chains, and the like. For example, the geared connection can be via at least one intermediate idler gear disposed between the drive gear and the rotatable valve.

In further aspects, the rotatable shaft can define at least one internal coolant passageway therethrough for transporting liquid engine coolant therethrough. The rotary machine can further include a rotary coupler in fluid communication with the at least one internal coolant passageway and the at least one internal working fluid passageway and/or additional passageways, such as for transporting lubricant. For example, the stationary first island can further define a third set of fluid passages therethrough for passing a lubricant therethrough.

In accordance with further aspects, the rotary machine can further include a power take off mechanism that includes a plurality of vanes extending outwardly from a ring structure attached to the main shaft of the machine, wherein the rotary machine is attached to an airframe of an aircraft, other vehicle or mount, wherein rotational energy of the vanes is converted into thrust generated by the plurality of vanes when the main shaft rotates. For example, the plurality of vanes can be propeller blades, turbine blades, or impeller blades.

The disclosure further provides a rotary machine including a rotatable casing defining a central axis A, the casing defining a cavity therein for receiving a stationary first island. The machine further includes a stationary first island disposed in the cavity of the rotatable casing. The first island has a body with a volume generally defined between front and rear surfaces that are spaced apart, the front and rear surfaces lying in a plane parallel to a radial axis R. The front and rear surfaces can have a rounded, non-circular shape. The perimeters of the front and rear surfaces can define a curved perimeter surface therebetween. The stationary first island can define a first set of fluid passages therethrough for passing a working fluid therethrough, and/or a second set of fluid passages for passing a coolant therethrough. The rotary machine can further include a stationary front side plate disposed adjacent to the front surface of the first island, and/or a stationary rear side plate disposed adjacent to the rear surface of the first island. The stationary rear side plate can define a plurality of ports passing therethrough in fluid communication with the first and second sets of fluid passages. The rotary machine can still further include a first (and second, third, or fourth, etc.) contour assembly disposed between the front side plate and the rear side plate. The first contour assembly can be attached to the casing proximate an outer region thereof The first contour assembly can be defined by a pair of opposed outwardly facing arcuately shaped front and rear surfaces that are connected by a concave inwardly facing surface. The concave inwardly facing surface of the contour assembly can face the curved perimeter surface of the first island. The concave inwardly facing surface and the curved perimeter surface of the island and the front side plate and rear side plate can cooperate to form a working volume. The casing and first contour assembly can be configured to rotate about the axis A with respect to the stationary island. In some implementations, the rotary machine can further include a central crankshaft having a central axis coincident with the axis A. The central crankshaft can be attached to a front plate of the casing.

If desired, the rotary machine can further include a power take off mechanism attached to an outer periphery of the casing. For example, the power take off mechanism can included a plurality of permanent magnets attached to the outer periphery of the casing. The rotary machine can be disposed within a bore of a stator of an electric generator, wherein rotational energy of the casing is converted into electrical power when the casing rotates with respect to the stator.

In further aspects, the power take off mechanism can include a plurality of vanes extending outwardly from the outer periphery of the casing. At least one of the front side plate, island and the back side plate of the rotary machine can be attached to an airframe of an aircraft or other vehicle or mounting location, wherein rotational energy of the casing is converted into thrust generated by the plurality of vanes when the casing rotates with respect to the stator. In one embodiment, the plurality of vanes are propeller blades, and the rotary machine can function as an airplane engine with a propeller. In another embodiment, the plurality of vanes can be turbine blades for use in air or water. For example, the turbine blades can be located within a nacelle for directing air or water through the nacelle. In still another embodiment, the vanes can be wind generator vanes that rotate the housing when under a wind load, and the rotary machine can compress and/or pressurize a working fluid including a gas and/or a liquid that can in turn be used to rotate an electric generator located on the ground or other location that the pressurized fluid is directed to.

It is to be understood that both the foregoing general description and the following detailed description are exemplary and are intended to provide further explanation of the embodiments disclosed herein.

The accompanying drawings, which are incorporated in and constitute part of this specification, are included to illustrate and provide a further understanding of the methods and systems of the disclosure. Together with the description, the drawings serve to explain the principles of the disclosed embodiments.

BRIEF DESCRIPTION OF DRAWINGS

Accompanying the description are plural images illustrating the disclosed embodiments, which represent non-limiting, examples and in which:

FIG. 5 illustrates contour wheels in engine assembly of the embodiment of FIG. 1;

FIGS. 19a-b are perspective views of the island of the embodiment of 14; and

FIGS. 21a-b are views of the embodiment of FIG. 14 as an aircraft engine.

FIGS. 23A-23B are perspective exterior and perspective cross sectional views of the engine of FIG. 1 modified to have two islands integrated into a turbine engine disposed in a nacelle.

DETAILED DESCRIPTION OF THE DISCLOSED EMBODIMENTS

Figure 1:
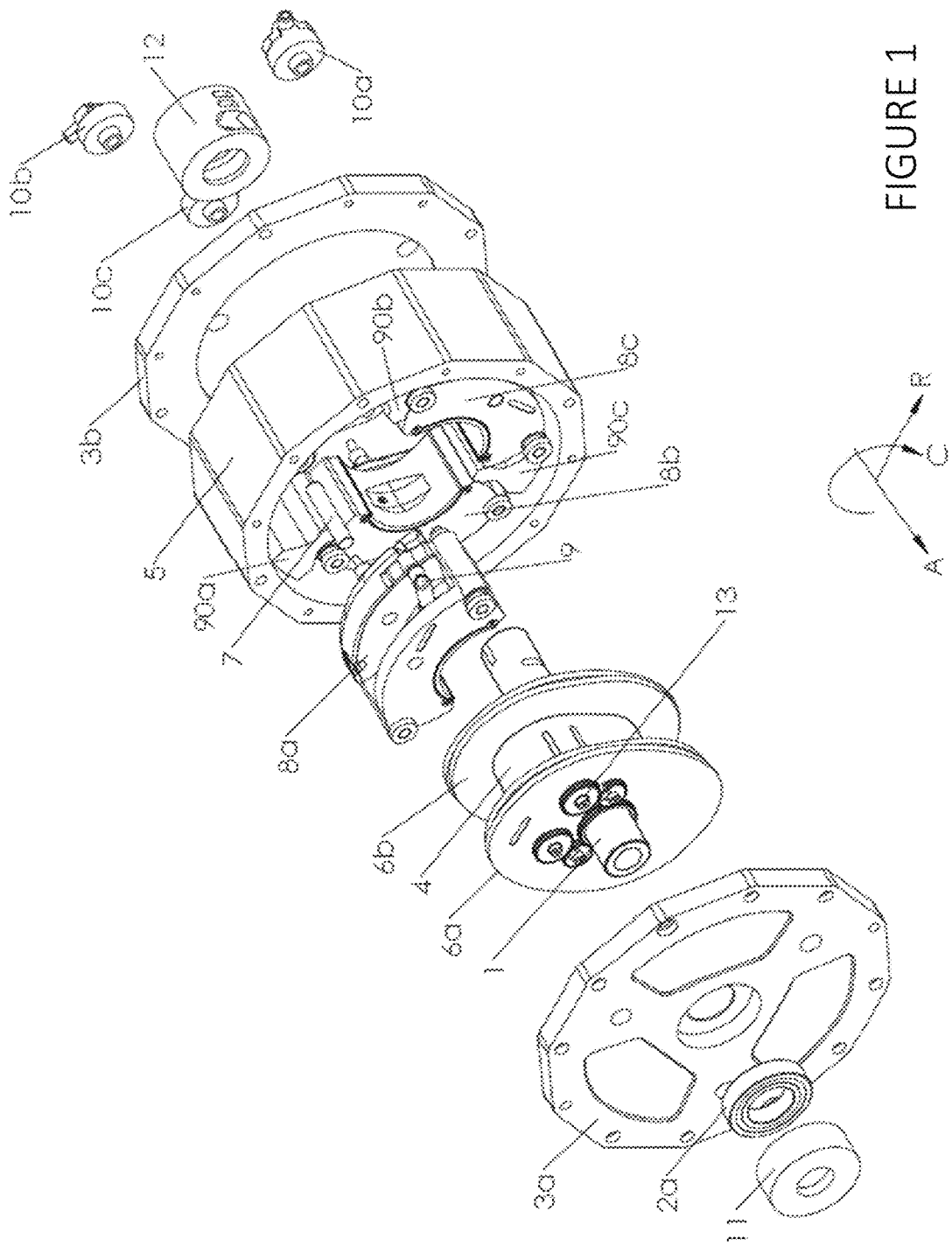
FIG. 1 illustrates an isometric view of an embodiment of a rotary machine in accordance with the disclosure.

Referring to FIG. 1, components are illustrated which form the disclosed embodiments. In addition, a coordinate system is illustrated which can be utilized for discussing the disclosed embodiments. This coordinate system is a cylindrical, three dimensional system, having axial (A), radial (R) and circumferential (C) axes. As illustrated in the Figure, a rotatable shaft 1 is held by a pair of front 2a and rear 2b radial "frictionless", oil film or plain bearings. The bearings are supported by a pair of front 3a and rear 3b stationary case end plates which are attached to a ring shaped case 5.

The rotating shaft 1 is affixed to, or has integrated in it, a cylindrical-like shaped structure 4 or "island". The non-round shape surface, is devised through proprietary computer simulation techniques. As illustrated in FIG. 1, mechanically fastened to or integrated to the flat ends of the island 4 are a pair of front 6a and rear 6b side plates, such that a gas-tight seal is formed. The side plates 6a, 6b rotate with the shaft 1, and island 4.

A concave-shaped part(s) or "contour assembly" 8a,b,c is inserted between plates 6a and 6b such that the concave opening is facing the island 4 forming a working volume there between. There can be a single contour 8a or a multitude shown by 8b and 8c. Outer housing 5 has at least one or up to N appendi, which point inward. This example shows a quantity of 3. The contours 8a,b,c are connected to outer housing 5, with Wrist pins 7, which, as illustrated, are disposed in a double shear mode that enables high rigidity in the structure but allows the contours to pivot by use of frictionless bearings, plain bearings or oil film bearings.

Mounted in each contours 8a,b,c, and pivoting with them, are spark plugs 9. To provide electrical connection to moving spark plugs 9 are rotary electrical insulating couplings 10a,b,c. Said couplings transfer the electrical circuit from a wire and insulator mounted on the moving contour to a fixed point outside of the engine case to which appropriate high voltage electrical source is attached.

Integrated inside shaft 1 and island 4 are cooling fluid channels. The coolant is transferred from external plumbing/conduits to the rotating shaft and island via rotary seal coupling 12. This coupling is shown as a single unit containing both inlet and outlet however it could be designed as two units on the same or opposite ends of shaft 1.

Also integrated inside shaft 1 is an inlet air and/or fuel passageway to bring combustion air/fuel into the working volume. Inlet air/fuel is transferred to rotating shaft from a fixed manifold, carburetor or throttle body via intake manifold ii. Shown is a co-axial flow intake manifold.

Also integrated inside shaft 1 and island 4 is an exhaust fume passageway to direct spent gases out of the working volume. Exhaust is expelled co-axially out the opposite end of the shaft from the intake or it can be expelled radially by use of a rotary coupling device shown as item 12 in FIG. 1.

Included within island 4 are from 1 to 4 or more valves which control the flow of intake and/or exhaust gasses to and from the working volume. FIG. 1, ref 13 shows a gear train which is used to revolve rotary valves as shown below.

Figure 2:
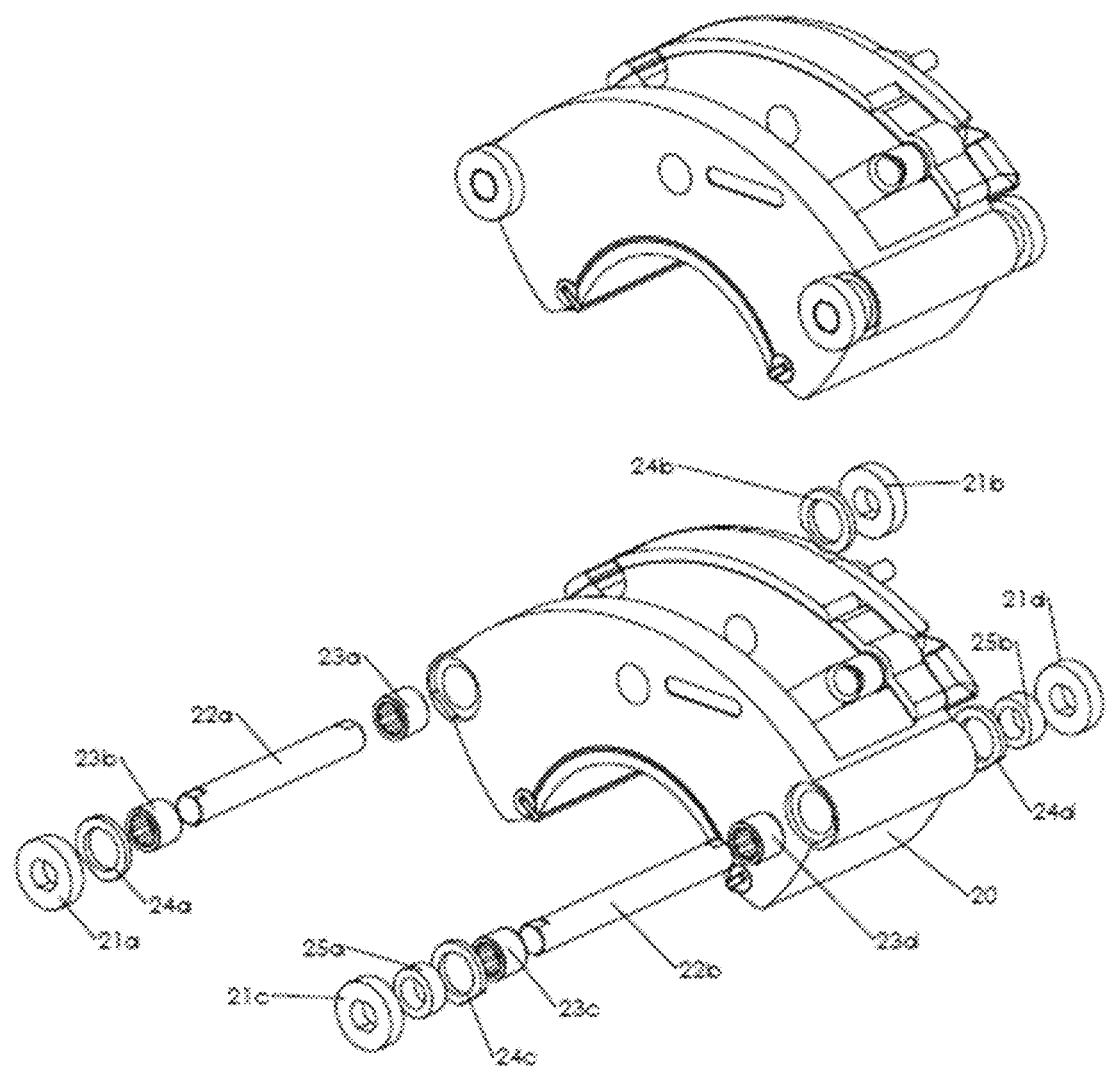
FIG. 2 illustrates a close up of contour wheels of the embodiment of FIG. 1.

FIG. 2 shows the contour assembly 8 in assembled and exploded view. Two complete two wheel axle assemblies are located on contour body 20. Each axle assembly contains two wheels 21a and 21b or 21c and 12d. Each pair of wheels is affixed to axle 22a or resp. 22b. Two frictionless or plain bearings 23a and 23b or 23c and 23d are pressed into contour body 20. Thrust washers 24a and 24b or resp. 24c and 24d are installed on the axles between the contour body 20 and rotating parts. Axles 22a or resp. 22b are inserted into these bearings and washers. In some cases, the wheels 21c and 21d are offset away from the contour body 20 with spacers 25a and 25b.

Figure 3:
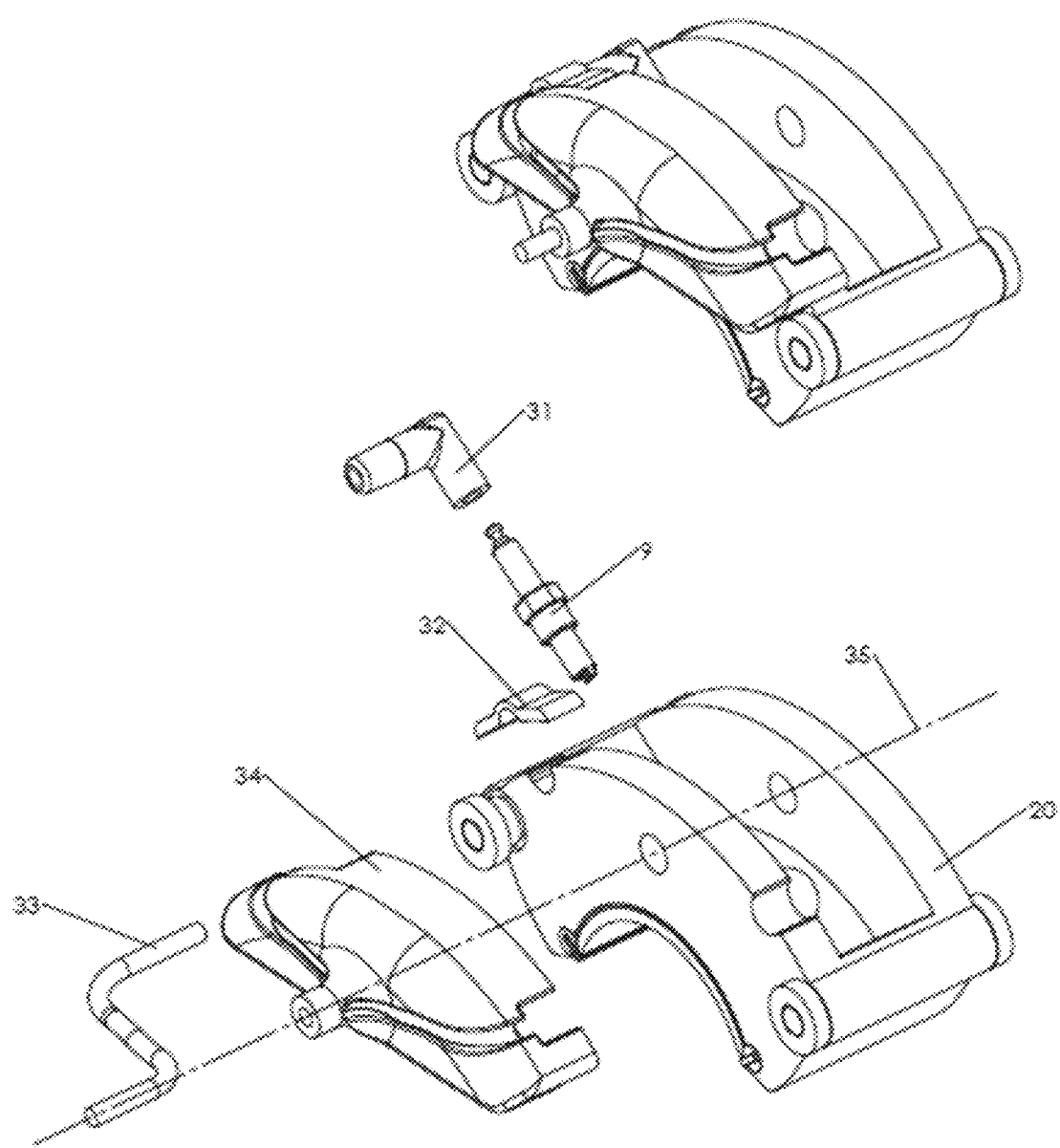
FIG. 3 illustrates the high voltage spark plug wiring parts of the embodiment of FIG. 1.

FIG. 3 shows the spark plug and the electrical connection. Contour body 20 contains the spark plug 9. A high voltage connection is made to the electrode of the spark plug 9, with boot 31. Clamp 32, which can be held in place by suitable fasteners (not shown) holds the boot from falling off. High voltage wire 33 is connected to boot 31 and is routed through insulated guide 34. The guide directs the wire such that it leaves the area concentric with the wrist pin center of rotation axis 35.

Figure 4:
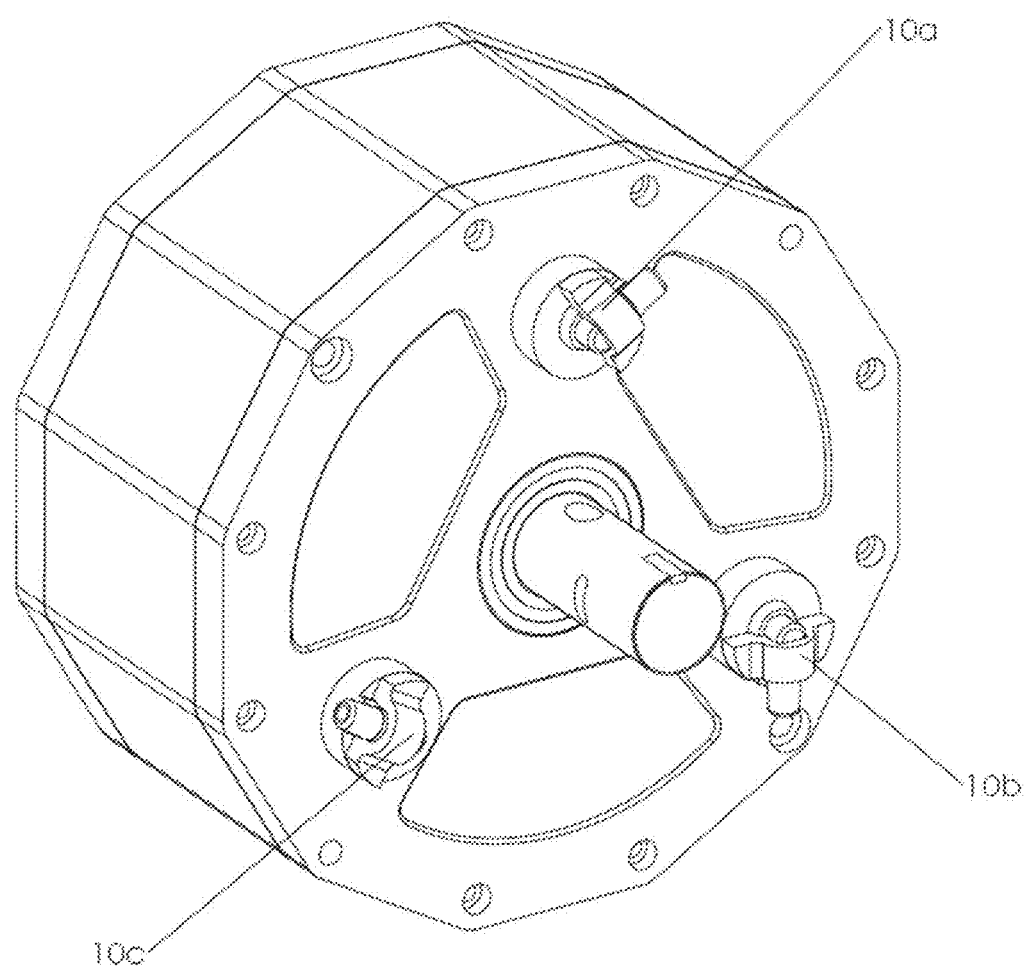
FIG. 4 illustrates high voltage wiring external connection of the embodiment of FIG. 1.

FIG. 4 shows the exterior of the engine and high voltage electrical insulating couplings 10a,b,c. Each insulated coupling is centered on the wrist pin axis of rotation. Stationary wires are connected to these couplings and then lead to high voltage ignition coils and/or a distributor (not illustrated).

FIG. 5 shows the contour(s) with the included wheels 21 (12 total indicated). Shaft 1 and the attached side plates 6a and 6b as well as the island (not shown) make the rotatable assembly. The perimeter of 6a has a specific cam like profile formed into it. The cam profile can be a single pattern or a dual pattern (two adjacent offset perimeters formed into the plate) shown as 50 and 51. In the case it is two patterns, one axle can have spacers installed as shown in FIG. 2, 25a and b. This can allow one wheel-axle set to follow one cam profile while the other follows a different profile. In the case with one cam profile, all the wheels can follow one profile. The opposite side plate 6b can have the same cam profile except it can be mirrored. When the shaft and side plates rotate the cam profile and wheel interaction can cause the contour 8, to pivot in the desired controlled manor.

Figure 6:
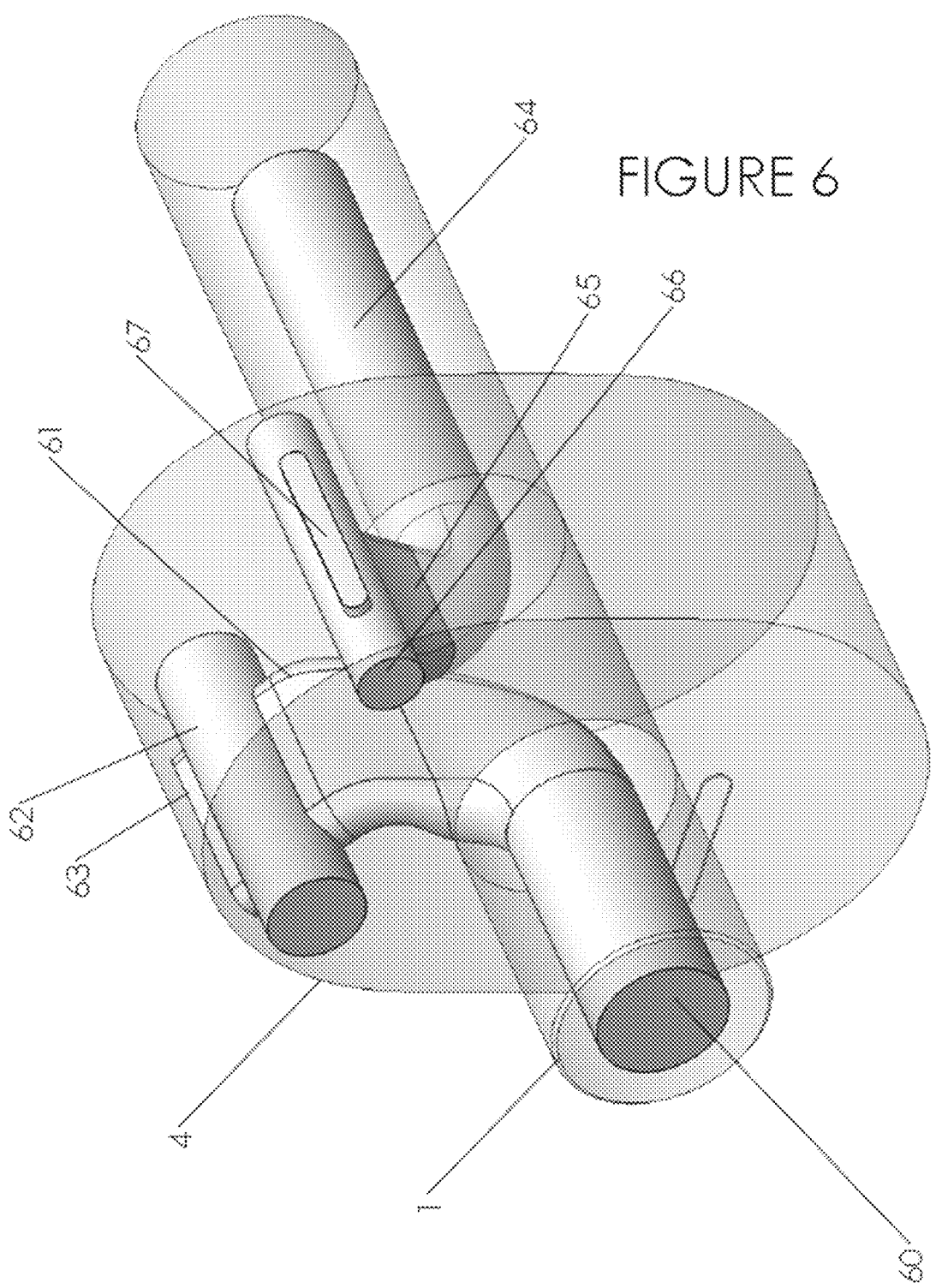
FIG. 6 illustrates intake and exhaust passageways of the embodiment of FIG. 1.

FIG. 6 shows the internal passageways for transporting intake air/fuel and exhaust. Shaft 1, is cylindrical and hollow to create passageway 60 which is coincident with the axis of rotation. At the shaft 1, island 4 interface, passageway 60 turns out radially from the center to passageway 61 in the island 4. The passageway intersects the valve cavity 62. The passageway ends at the port opening 63 at the surface of the island.

FIG. 6 also shows the exhaust entering the island through port 67. Then the exhaust passes through valve cavity 66 to island passageway 65. The exhaust continues into the center of the shaft 1 and turns axially and down center hole 64 where it exits the engine. The exhaust can ether exit the shaft directly, coaxially or can be turned radially through rotary coupling 12, shown in FIG. 1.

Figure 7:
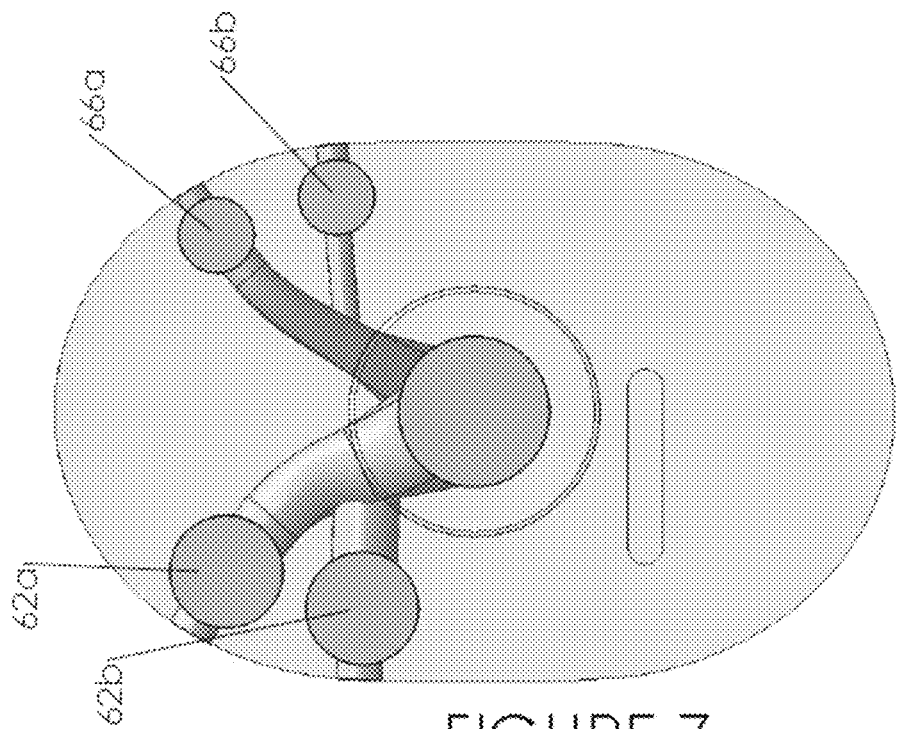
FIG. 7 illustrates valve cavities and island passageways of the embodiment of FIG. 1.
Figure 7:
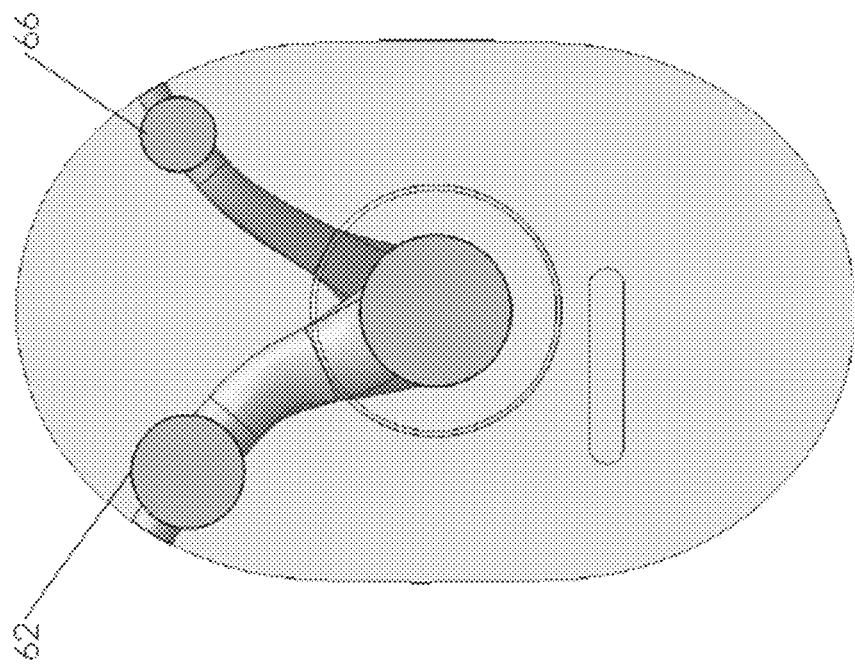

FIG. 7 shows a cut away view with two variations. The single port variant uses only one intake valve and one exhaust valve. A dual port version is possible if increased air flow and longer effective opening time is required. In the dual port version with dual valves shown on the right, the intake passageway is split at its base creating two passageways. Separate passageways then lead to individual valve cavities 62a and 62b and then to separate ports. The same construction is used for the exhaust. In the exhaust, two valves 66a and 66b are control the flow from two ports at the surface of the island.

Figure 8:
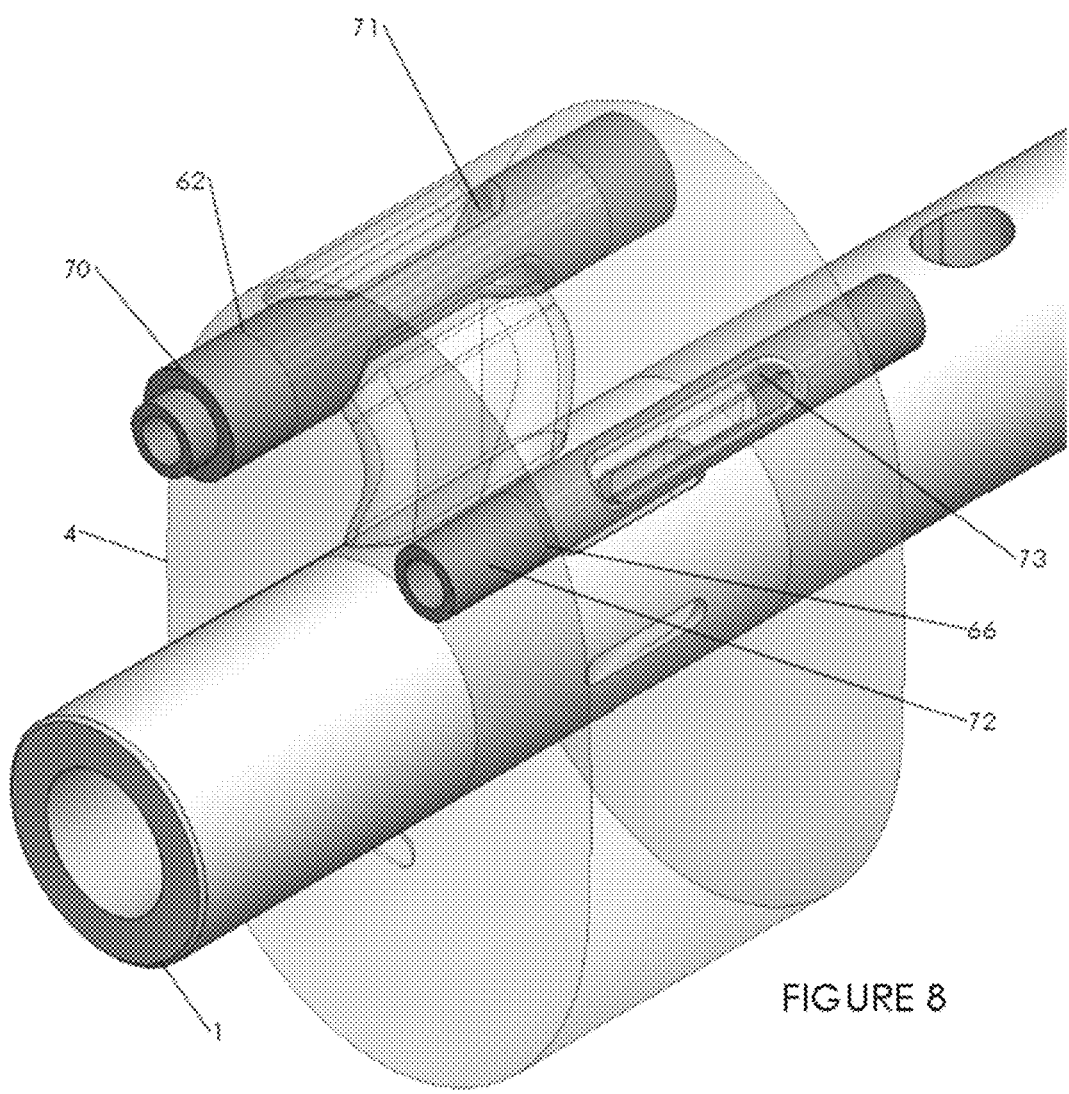
FIGS. 8 & 9 illustrates valves in assembly of the embodiment of FIG. 1.
Figure 9:
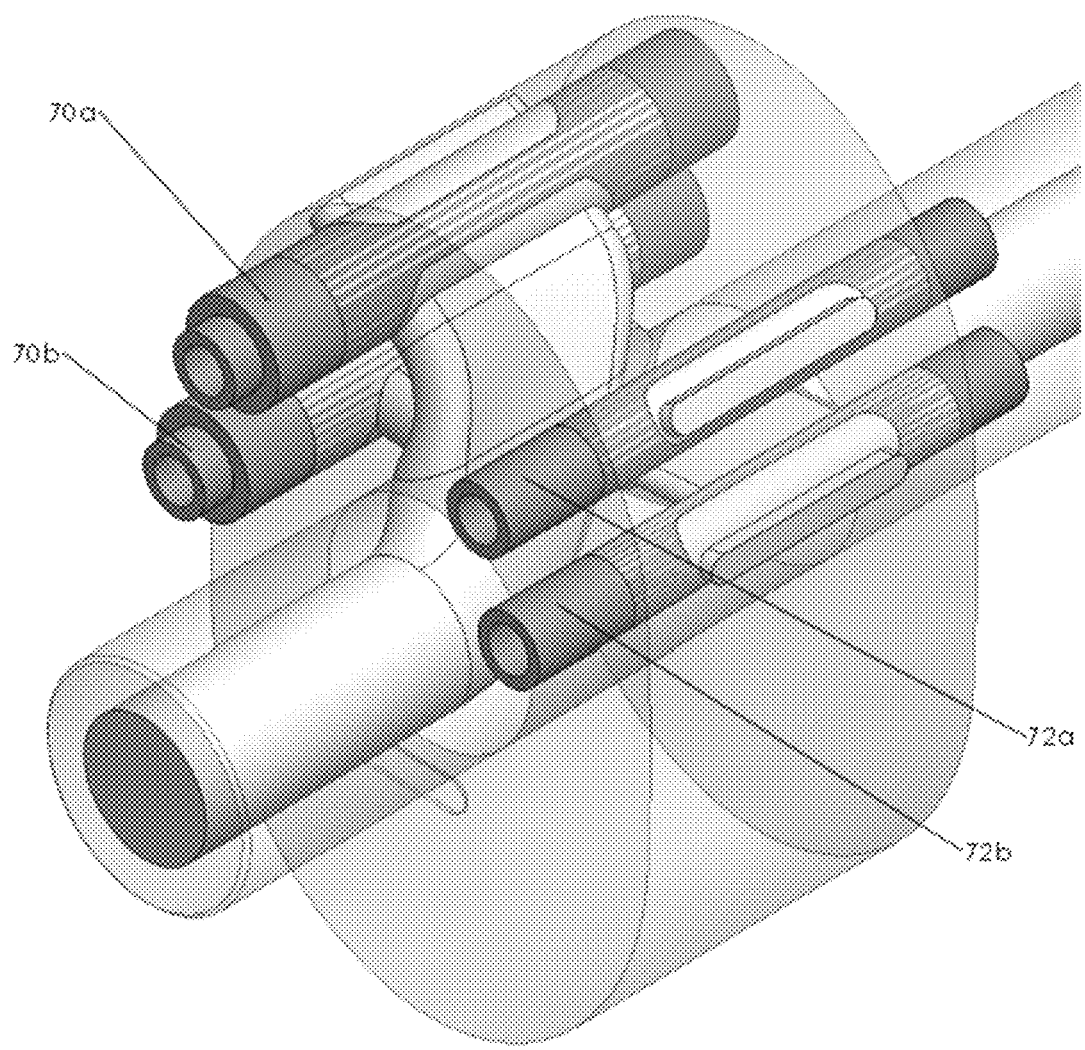

Valves can be used to control the flow of gases into and out of the working volume. FIG. 8 shows a single valve configuration. A dual valve is similar but with twice as many valve of similar construction as shown in FIG. 9. The island 4, attached to shaft 1 has two valve cavities 62 and 66, (see FIGS. 7 and 8), which are cylindrical in shape. Cylindrical valves 70 single, or 70a & 70b dual, for intake and 72 single or 72a & 72b dual, for exhaust are inserted into the valve cavities. The intake valve 70 (*a, b*) is typically, but not required to be, larger in diameter than the exhaust valve 72 (*a, b*). Each valve has a transverse slit 71 or 73 cut into it. This allows gasses to pass the valve when the slit is aligned to the direction of flow. When the valve is turned to be perpendicular to the flow of gas, it blocks the flow.

Figure 10:
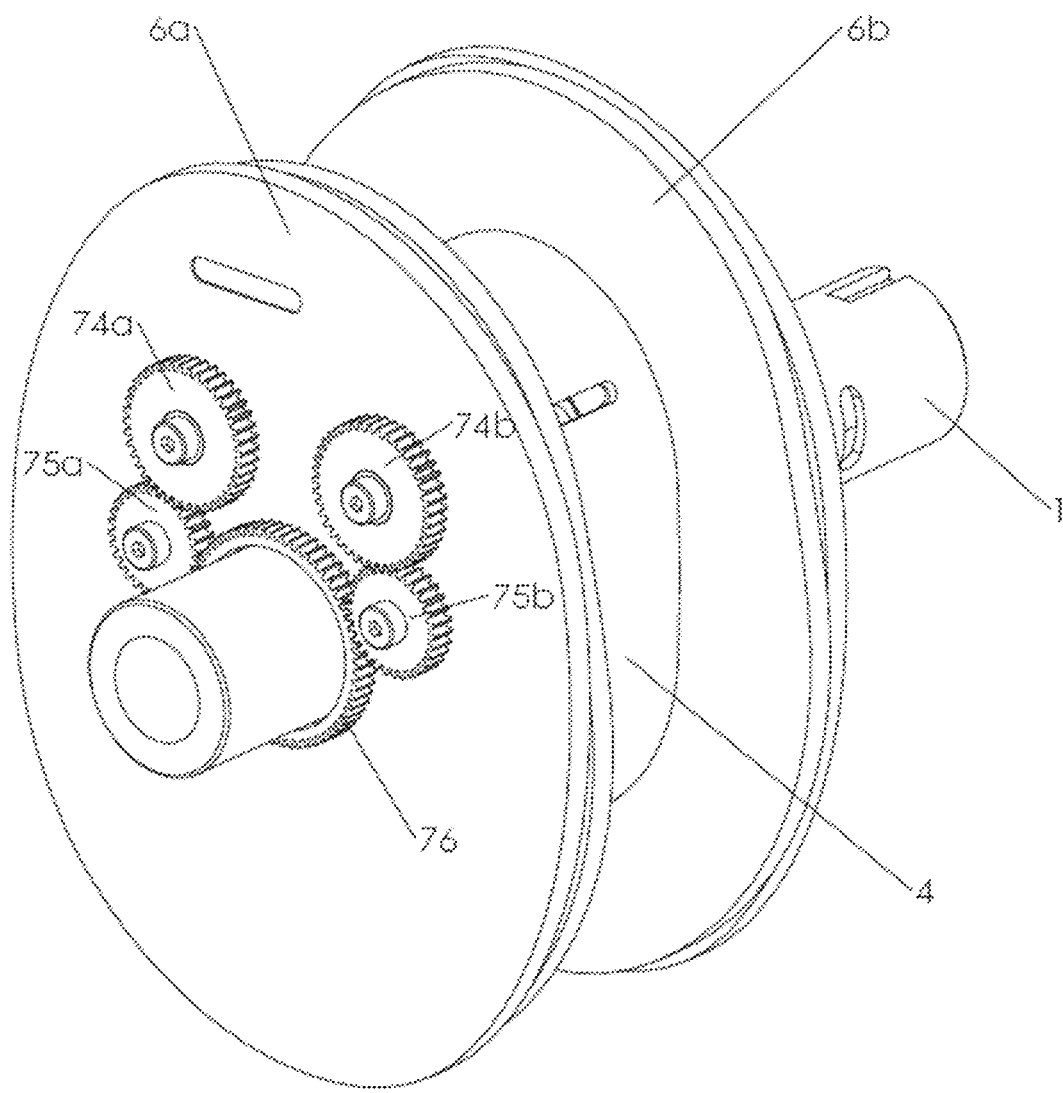
FIG. 10 illustrates valve gear train of the embodiment of FIG. 1.

The valves rotate in timed sequence the position of the island-side plate rotating core. FIG. 10 shows the gear train for single valves. Dual valves are similar but with more gears. To turn the valve, a gear 74a intake or 74b exhaust is attached to the end of each valve shaft which is made longer and protrudes beyond the side plate 6a. A second idler gears 75a or 75b, is attached to the side plate and drives the valve shaft gear 74a or 74b. This gear is an idler gear and serves to change the direction of rotation of the valve. The driver gear is a larger stationary gear 76 mounted in a fixed position on the inside face of case side plate 3a (FIG. 1). This driver gear 76, does not rotate with respect to the island, and is stationary. The other portions of the gear train instead rotate about driver gear 76.

The gear ratio between the fixed driver gear 76, and the valve shaft driven gear 74a or 74b is 1.5 to accommodate 3 combustion events per revolution. Each valve is open 2 times per valve shaft revolution. The idler gear 75a or 75b is free to rotate on its shaft and its ratio to the others need not be specified.

Figure 11:
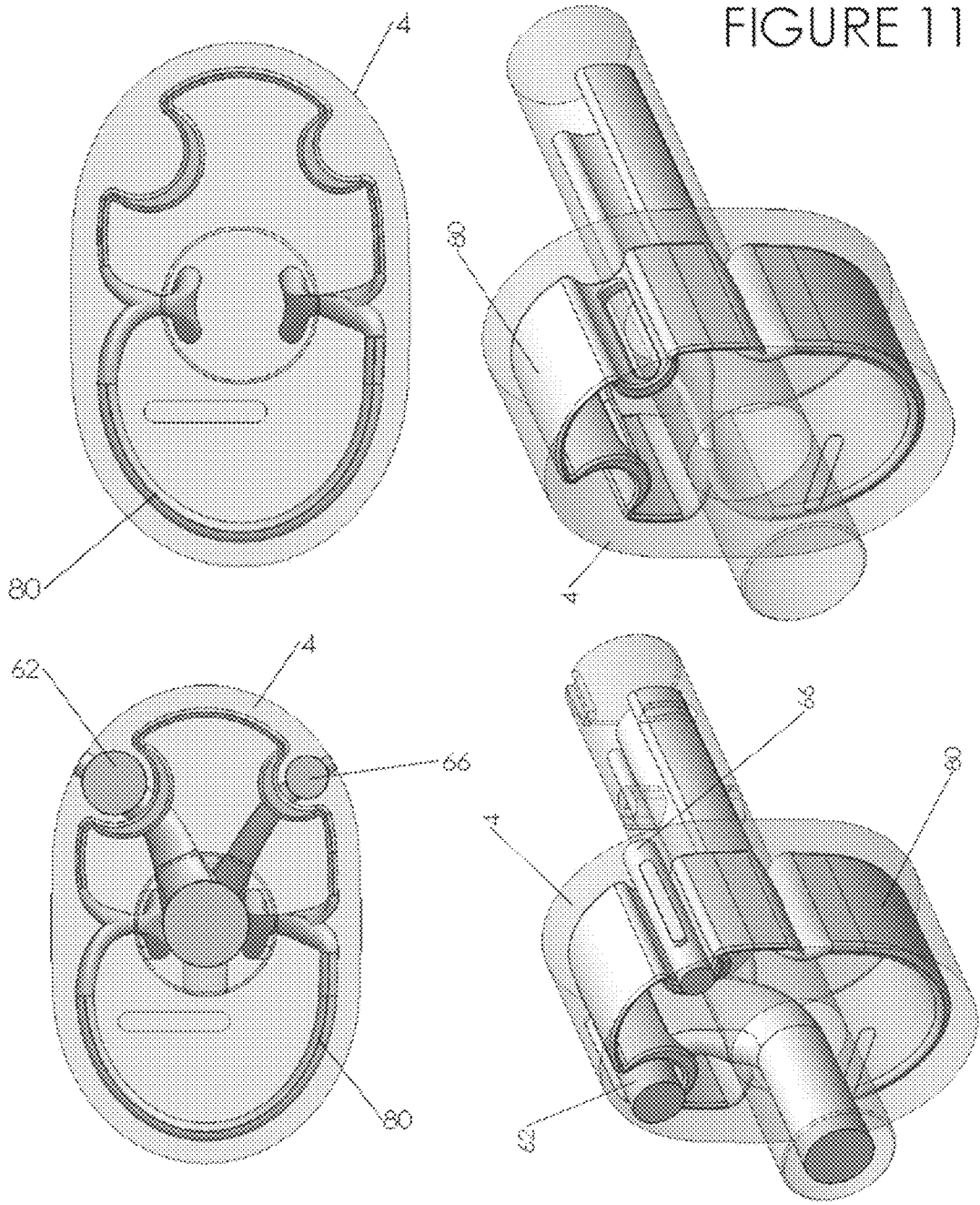
FIG. 11 illustrates fluid cooling passageways of the embodiment of FIG. 1.

In order to cool the parts exposed to combustion and exhaust, liquid cooling passageways are designed into the shaft 1 and island 4. FIG. 11 shows the island and internal fluid passageways 80. Fluid travels through the passageways which are either machined or cast in place. This allows the fluid to come close to the combustion surface and transfer the heat of combustion to the fluid coolant.

Figure 12:
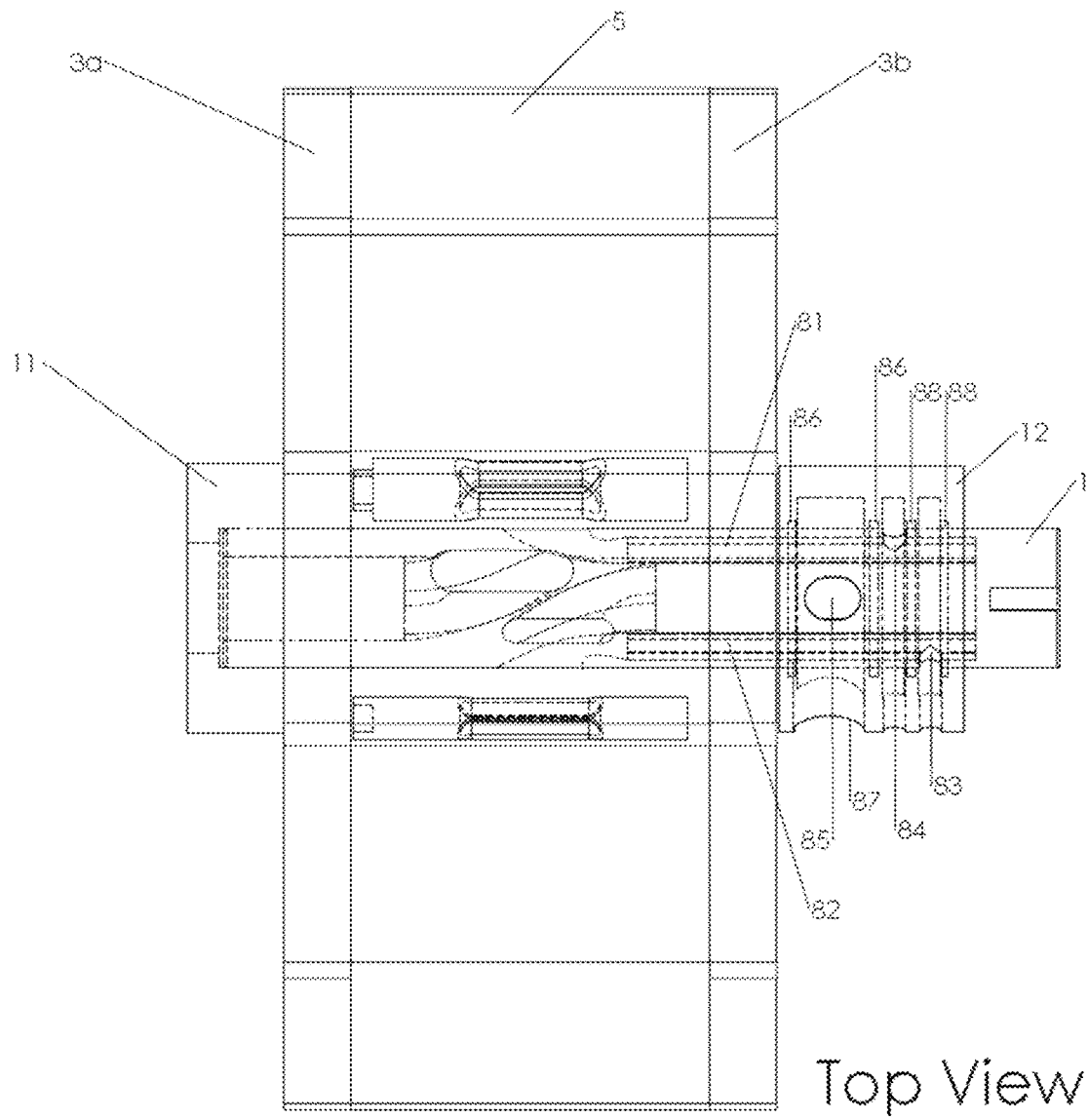
FIG. 12 illustrates rotary coupling for exhaust and cooling fluid of the embodiment of FIG. 1.

In order to transfer exhaust and cooling fluids, a rotary coupler 12, is used as shown in FIG. 12. Shaft 1, has axial passageways to allow intake, exhaust, coolant in and coolant out flows. A rotary coupler 12 is used to convert the spinning passageways to fixed one to which pipes and tubes can be attached.

Fluid coolant is brought in under pressure to port 83 on coupler 12. It is prevented from going down the shaft by rotary seals 88 (×2). Then it enters into axial holes 8i. Fluid travels axially and into the island passageway figure ii, 80. After picking up heat in passageway 8o, the hot coolant comes out through axial holes 82 and turns radially out into hole 84. Shaft seals 86 and 88 keep the fluid from leaking down the rotating shaft.

Radially drilled hole 85 is used to bring the exhaust gas from the center of the shaft 1 to the surface of the shaft. High temperature rotary seals 86 (×2) are used to keep the hot gases from leaking out along the shaft. An exhaust pipe is then attached to the stationary port 87 located on the coupler 12.

Figure 13:
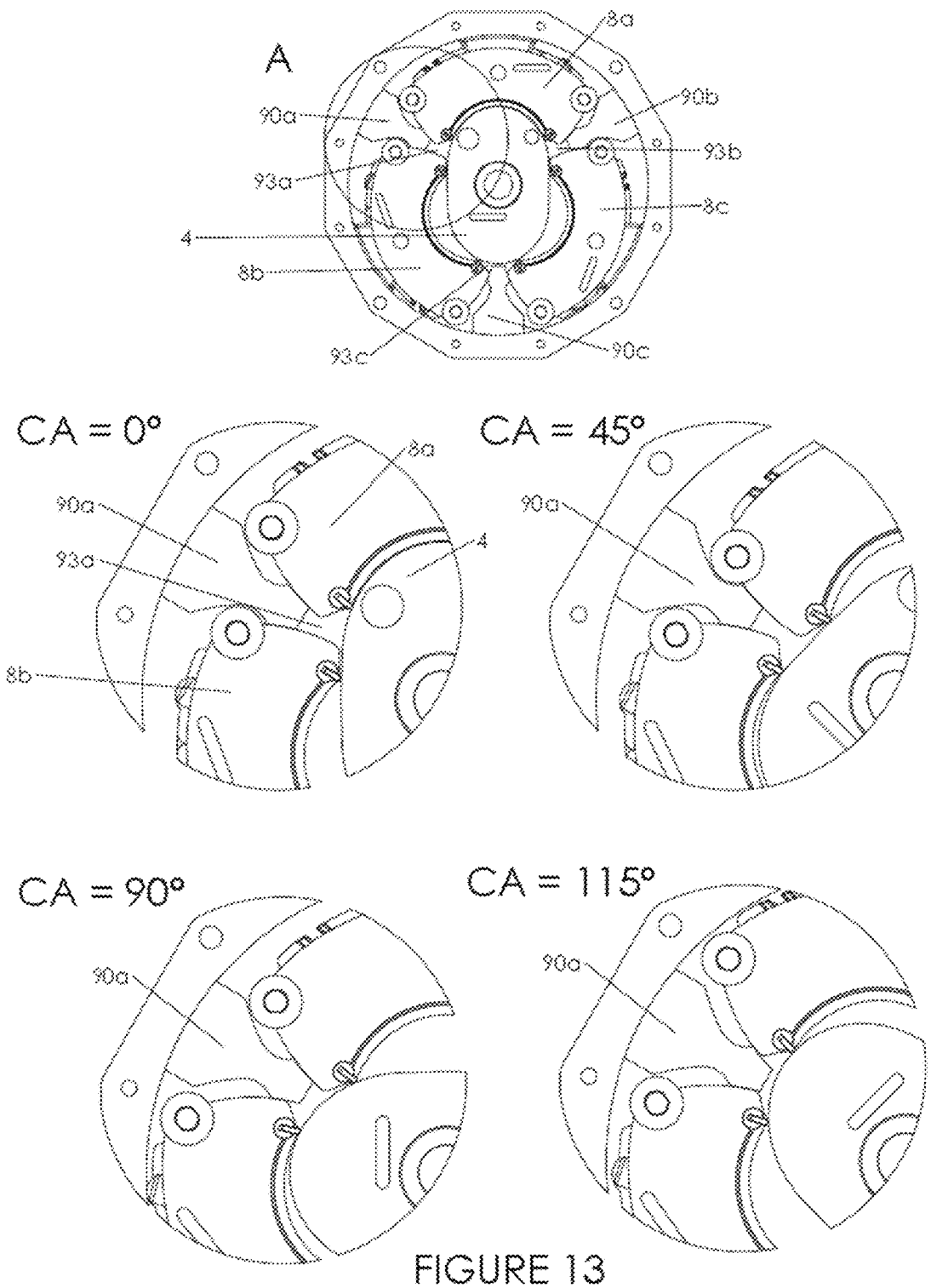
FIG. 13 illustrates case feature for protecting oil from high-temperature surfaces of the embodiment of FIG. 1.

FIG. 13 shows case protrusions 90a-c known as "Keystones" which plug the gap between adjacent Contours 8a-c. This prevents oil present in the engine case from filling the cavities 93a-c, where would otherwise come in contact with the high temperature surfaces of the Island 4. This improvement thus eliminates oil consumption from oil-smoking and ingestion into the combustion chamber.

Figure 14:
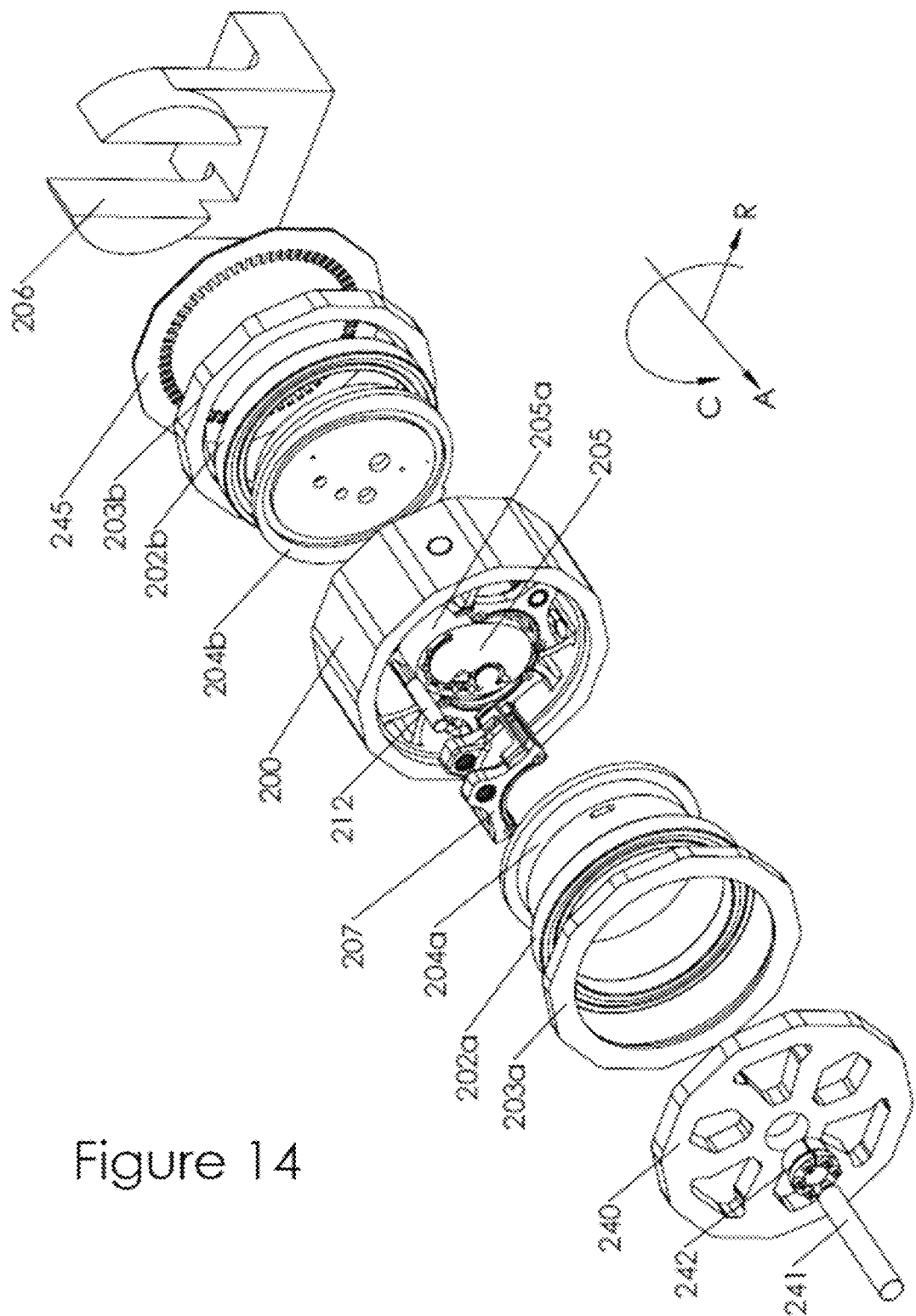
FIG. 14 is an exploded view of a second embodiment of a rotary machine in accordance with the disclosure.

Referring to FIG. 14, additional components are illustrated which form a further embodiment of a rotary machine in accordance with the disclosure. A coordinate system is similarly illustrated which will be utilized for discussion, which is also a cylindrical, three dimensional system, consisting of axial (A), radial (R) and circumferential (C) axes. As illustrated in FIG. 14, a rotatable housing "Carousel" 200 is held by a pair of front 202a and rear 202b large diameter radial frictionless, oil film or plain bearings. Retaining rings front 203a and rear 203b hold the bearings affix to the Carousel. The bearings are supported by a pair of stationary front 204a and rear 204b case end plates.

The stationary front 204a and rear 204b case end plates are affixed to, or are integrated with, a cylindrical-like shaped structure 205 or "Island". The non-round shape surface, 205a can be designed to provide a substantially uniform spacing between the surface and the contour assemblies.

As illustrated in FIG. 14, mechanically fastened to or integrated to the front and rear of the island 205 are a pair of front 204a and rear 204b side plates, such that a fluid tight (preferably gas-tight) seal is formed. The side plates 204a, 204b are stationary and are rigidly attached to an engine mount, one embodiment of which is shown by 206, though it will appreciate that many configurations are possible.

A concave-shaped part or contour assembly 207 is inserted between plates 204a and 206b such that the concave opening is facing the island 205 forming a working volume 210 (FIG. 15) therebetween. A pair of first 2na and second 211b apex seal (FIG. 16), contact the convex surface of the island 205 and the parallel surfaces of the side plates 204a, 204b. Each pair of apex seals 211a and 211b are able to slide in their respective sockets 216a and 216b to accommodate any error in the contour's motion or island's shape.

Carousel 200 has at least one and up to N bosses or appendages 212a, which point inward. This example shows a quantity of 3 (212a, 212b and 212C of FIG. 15). Carousel 200, rotates on radial "frictionless" (i.e. very low friction), oil film or plain bearings 202a and 202b. Wrist pins 213, are disposed in a double shear mode that provides high rigidity in the structure.

Figure 15:
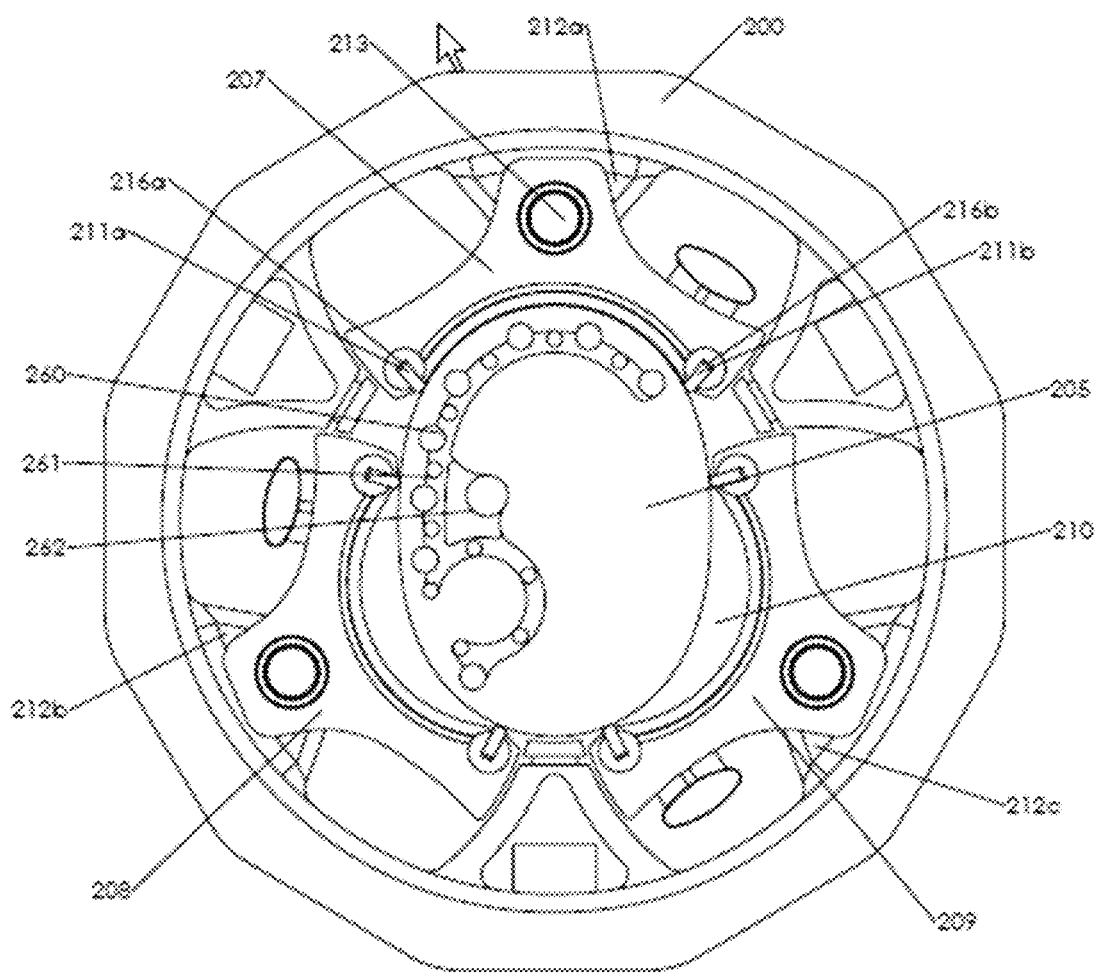
FIG. 15 is an end view of the embodiment of FIG. 14 illustration the relative positioning of the contours and island.
Figure 16:
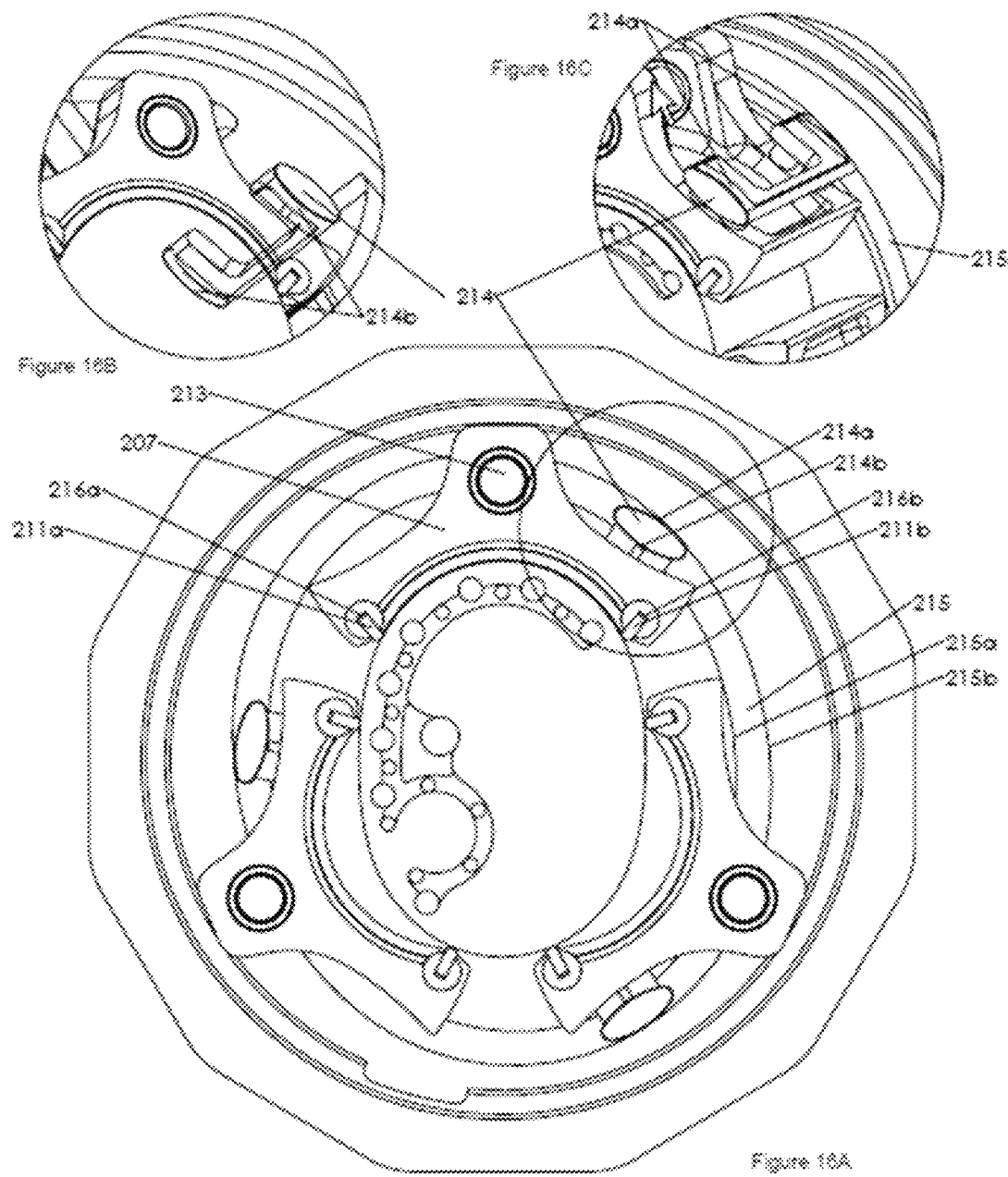
FIG. 16 presents a view of the contour assembly of FIG. 14 and aspects thereof.

The parts in FIG. 16 actuate the motion of the contour assembly 207. The contour assembly 207 is connected to a boss/appendage 212a on rotating Carousel 200 by way of wrist pin 213 (shown previously in FIG. 15). This connection allows the contour assembly 213 to pivot or oscillate in the plane as viewed in FIG. 16 about the center of wrist pin 213. To reduce friction, such wrist pin may be coupled to a pair of "frictionless" bearings, 230a, 230b of FIG. 17, which are pressed into the contour 220 or alternatively such frictionless bearing can be pressed into tab 212a and pin 213 is affixed to the contour 207. The contour assembly includes a contour-control "cam paddle" 214, with upper 214a and lower 214b surfaces. The cam paddle 214 slides inside slot 215, which is embedded in both front side plate 204a and rear side plate 204b. Slot 215 itself has inner 215a and outer 215b surfaces, which mate with the cam paddle upper 214a and lower 214b surfaces, and are lubricated by an oil film. The shape of the cam paddle surfaces 214a, 214b, are arcuate, in that they are comprised of two opposing arcuate generally horizontal surfaces joined at their ends by arcuate surfaces of significantly smaller radius. The position and radii of these surfaces are chosen to minimize weight while maintaining strength and acceptable surface wear performance. The shape of the slot surfaces 215a, and 215b are devised to match the orbit of the paddle surfaces as the rotary machine rotates. As the Carousel 200 rotates, carrying the wrist pin 213 and thus the contour assembly 207 in an orbit around the island 205, the cam paddle 214 interacts with slot 215 so as to rock the contour clockwise and counter clockwise (as viewed in FIG. 17), thus minimizing the travel of apex seals 211a and 211b in their retaining sockets 216a and 216b.

Figure 17:
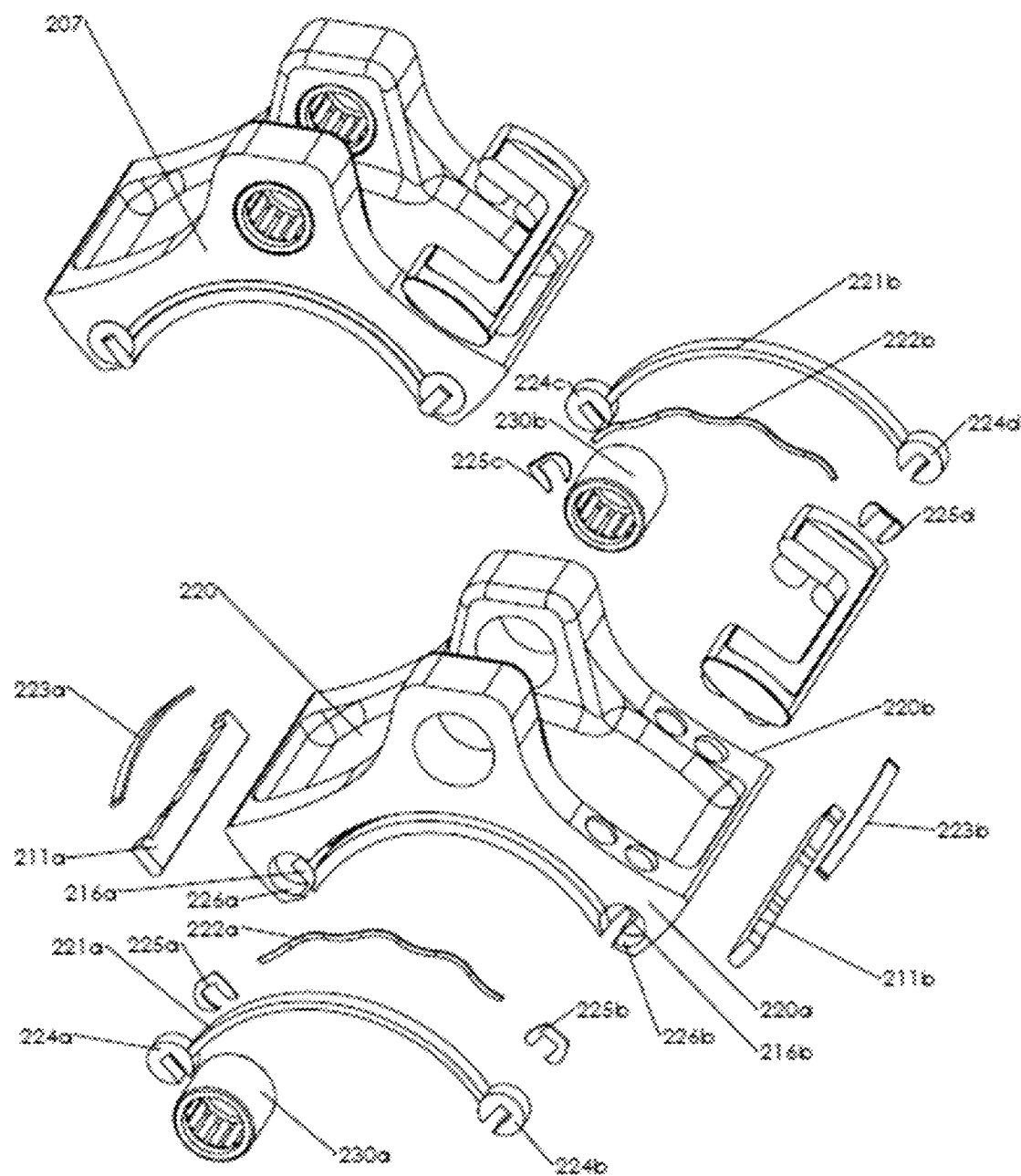
FIG. 17 is an exploded view of the contour assembly of FIG. 14.

The contour assembly 207 as shown in FIG. 17, includes a main body 220 and additional parts, discussed below, to help to prevent leakage of the working gases from the working volume.

The main body 220 of contour assembly 207 is narrower than the thickness of the island 205. Main body 220 can be made, for example, from aluminum or other lightweight materials as well as cast iron or forged steel. A gap, which is sealed, is located between the main body 220 of the contour assembly 207 (FIG. 14) and the adjacent side plates 204a, 204b. To bridge this gap and keep gases in the working volume 210, the floating side seals 221a, 221b (FIG. 17) are embedded in opposing flat faces 220a, 220b of the contour 220. The side seals 221a, 221b sit atop the preloading wavy springs 222a, 222b. An inner surface of the contour main body 220 can be provided with a three dimensional concavity, as desired, to achieve various high compression ratios useful for diesel fueled applications, such as 20:1, 21:1, 22:1, 23:1, 24:1, 25:1, 26:1, 27:1, 28:1, 29:1 and 30:1. Maintaining the island and end plates in a stationary manner helps facilitate achieving high compression ratios.

To prevent gases from leaking out the apex points (FIG. 15) floating seals 211a, 211b are inserted into transverse, axially extending, matching channels 216a and 216b in the contour body 220. The seals 211a, 211b and matching channels 216a, b are dimensioned to minimize leakage over the top and around 211a, b but still allow movement of the floating seal.

Preloading springs 223a, 223b (FIG. 17) maintain a nominal seal contact force of the apex seals 211a, 211b. For enhancing seal contact force, internal gas pressure "P" (FIG. 17) within working volume 210 creates an unbalanced load on the seals, thus increasing the seal contact force at 211a and 211b proportionally to the internal pressure of the working volume 210. Preloading springs, 223a and 223b furthermore assist in correcting for differences in the motion and wear at the contact points of 211a, 211b. To further enhance sealing, corner seals 224a, 224b, 224c and 224d with one each respectively preload springs 225a, 225b, 225c and 225d are installed in matching pockets 226a, 226b, 226c and 226d.

Figure 18:
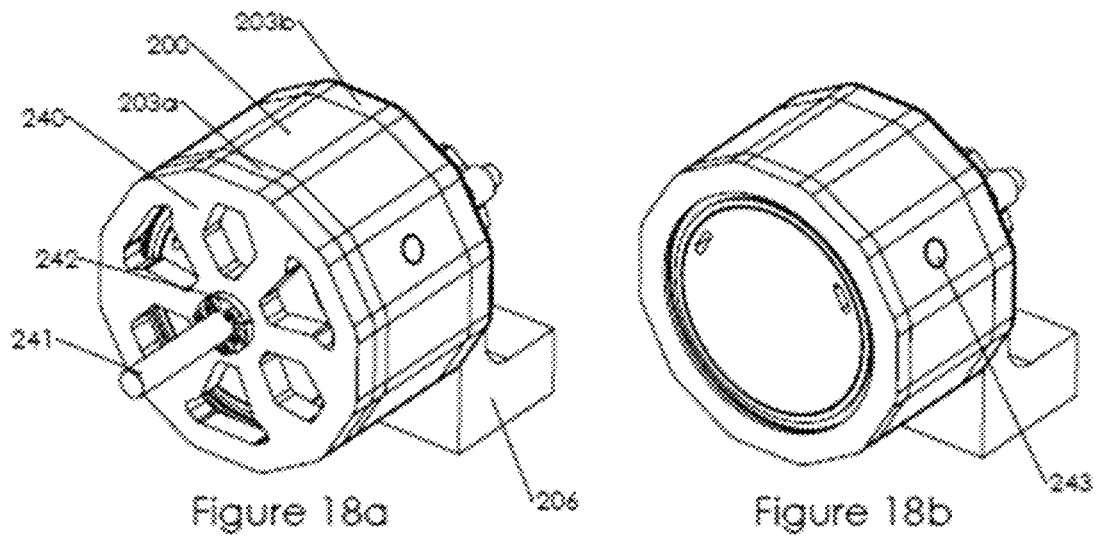
FIGS. 18a-c are various external views of the embodiment of FIG. 14.
Figure 18:
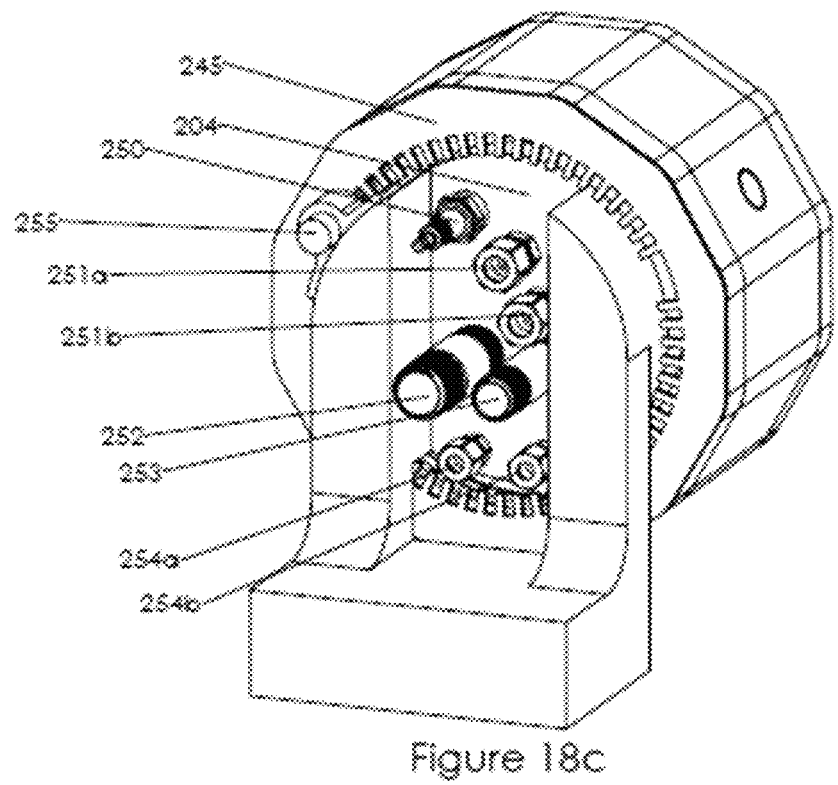

To support the engine, a base or mount 206 (FIG. 18a) can be affixed to side plate 204. A compression adapter or flange fitting can be used on power output wheel 240 to produce rotational power output on shaft 241. If needed, holes 243 can be added to the carousel 200 to provide ventilation to the rotating assembly of FIG. 18l3. FIG. 18c shows the services which can be incorporated into the fixed side plate 204. Specifically illustrated are sparkplug 250, liquid cooling inlet 251a, liquid cooling outlet 251b, air-fuel inlet pipe 252, exhaust gas pipe 253, oil lubrication inlet 254a and oil lube output 254b. A magnetic or Hall Effect position sensor can be located at 255 to detect the angular velocity and location of the carousel assembly by detecting the passage of the teeth of the tone wheel 245. This sensor's electrical output is attached to electronic ignition circuits (not shown) that make the spark plug ignite.

When used as an internal combustion engine, a carburetor or fuel injector and throttle plate, not shown, creates the appropriate air & fuel mixture and is plumbed to pipe 252. Pipe 252 leads to a cross drilled passageway 256 in the island 205 of FIG. 19a. This air & fuel mixture then turns and comes out elongated port 257. When the contour assembly 207 spins around island 205 such that the working volume 210 passes over the port 257, the air & fuel mixture is sucked into the working volume. As the contour 207 continues to orbit around island 205, the air fuel mixture is compressed. At or near the point of minimum volume of 210, sparkplug 250 is electrically ignited by high voltage electricity. Such ignition initiates the burn of the air & fuel mixture and the subsequent expansion of gasses in the working volume 210 creates rotary work upon the carousel 200.

After usable combustion work is spent, the elongated exhaust port 258 of FIG. 19b is exposed to the working volume 210. Spent gases are pushed out port 258 by the falling working volume 210. Exhaust gases then turn and come out hole 259 which is connected to pipe 253 of FIG. 18c. The contour 207 continues to orbit around island 205 until inlet port 257 comes into the working volume and the combustion cycle is repeated.

If three contour assemblies 207, 208 and 209 are used as shown in FIG. 15, a total of three complete combustion cycles are performed in one revolution. The shape of the island 205 can be chosen to modify the variation in working volume over the engine cycle so as to exhibit a power stroke maximum volume which is larger than the intake stroke maximum volume. Additionally, the length and closing point of intake port 257 can be modified to simulate a smaller intake stroke volume. When the expansion volume is larger than the intake volume, it is said to be an "Atkinson Cycle". The ratio of the expansion volume over the intake volume is known as the Atkinson ratio. Ratios significantly greater than 1.0 can produce higher fuel efficiency combustion engines. Particular geometry details of the invention can be easily modified to boost the Atkinson ratio well over 1.0.

As the combustion of fuel creates significant heat, liquid cooling passageways 260, 261 and 262 are incorporated into the island 205 shown on FIG. 15. Additional liquid cooling passageways are added around the exhaust paths as very hot temperature extremes are typically present in this location. Liquid cooling passageways are routed to inlet and outlet fitting 251a and 251b.

To allow for lubrication of friction surfaces within the engine, pressurized oil is pumped into pipe fitting 254a and then released inside the carousel case 200 at strategic places. A pickup device is then used to scoop up excess oil and pipe it out fitting 254b.

Figure 20A:
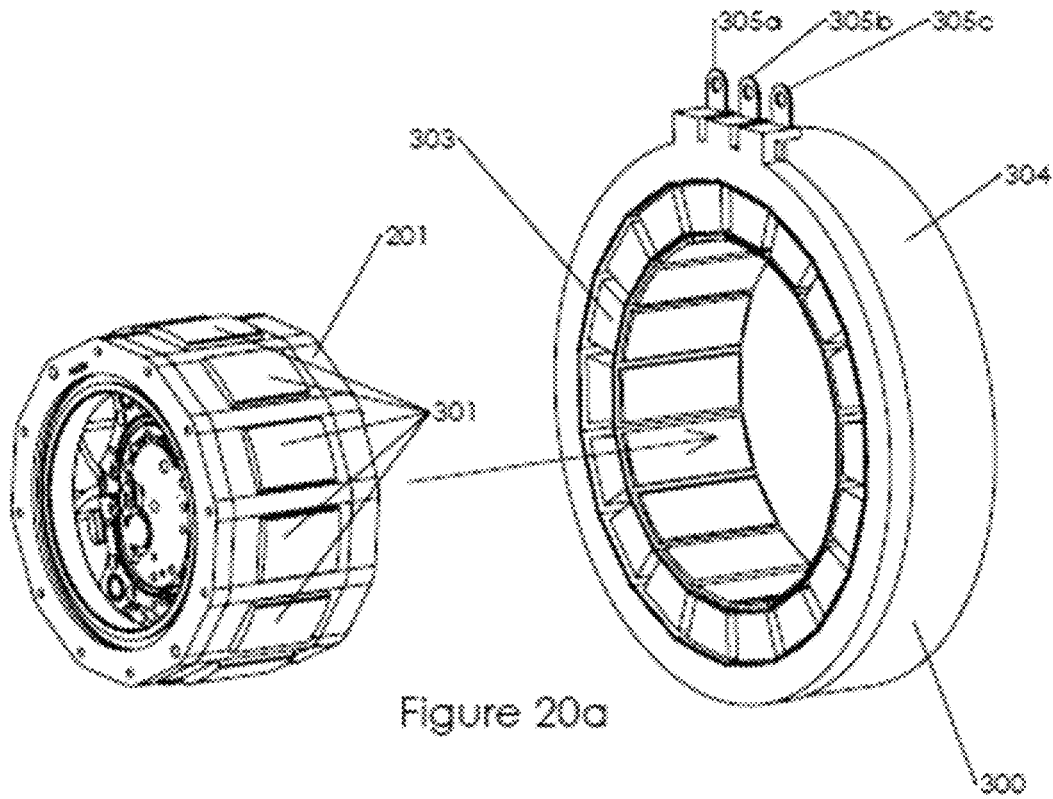
FIGS. 20a-b are views of the embodiment of FIG. 14 incorporated into an electrical generator.
Figure 20B:
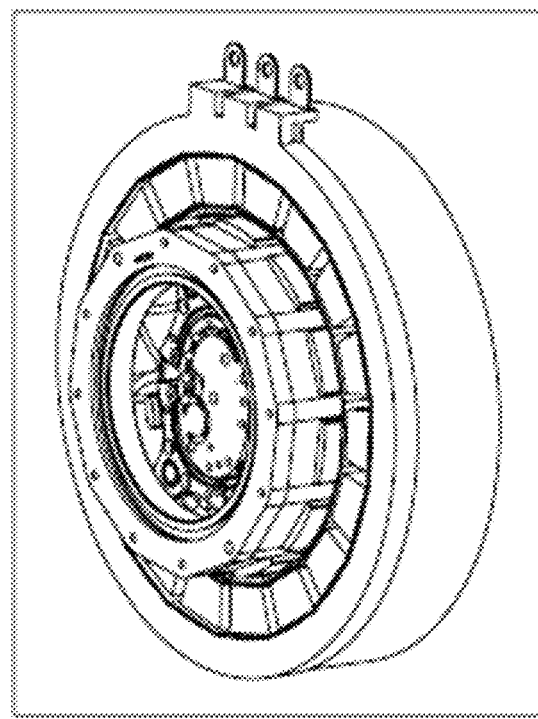

A possible configuration of an illustrative embodiment is shown in FIGS. 20a & b, as an electrical generator. In this embodiment, the outer surface of the carousel 200 is populated with a multiplicity of strong permanent magnets 301. These magnets spin at a high rate of speed about the axis "A" of rotation. The rotating assembly, engine and magnets, are inserted into a fixed stator assembly 300. Fixed stator assembly, 300 is made of multiple fixed wire coils 303 circumferentially disposed about a suitably configured steel ring 304. Wires for the coils are routed so that a single or multiphase, typically 3 phase, circuit configuration is formed. Electrical connections 305a, b, c are made available to harness electrical energy created by the rapid crossing of each moving magnet's field over the fixed wire coils. The entire rotating assembly and fixed stator is then packaged into a case as illustrated in FIG. 20b, with the necessary electronics to start the engine and create useful electrical power with the desired characteristics.

Another possible configuration of the illustrative embodiment is shown in FIGS. Zia & b, as a propeller drive engine for an aircraft. In this embodiment, the outer surface of the engine 200 is populated with a multiplicity of propeller blades 401. This example shows 6, but the number could be between 2 and "n". These propeller blade sections spin at a high rate of speed about the axis "A" of rotation. The fixed surface of side plate 204b is then attached to the aircraft fuselage engine bulkhead. The rotating assembly consisting of engine and propellers can then be covered with an aerodynamically suitable covering/nacelle. Rotation of the engine and movement of the propeller blades creates thrust to propel the aircraft in the desired direction. As will be appreciated, the back side plate of the engine attached to the stationary island containing the fluid connections can be affixed to the airframe, and the casing and propeller blades can rotate around the island.

Figure 22:
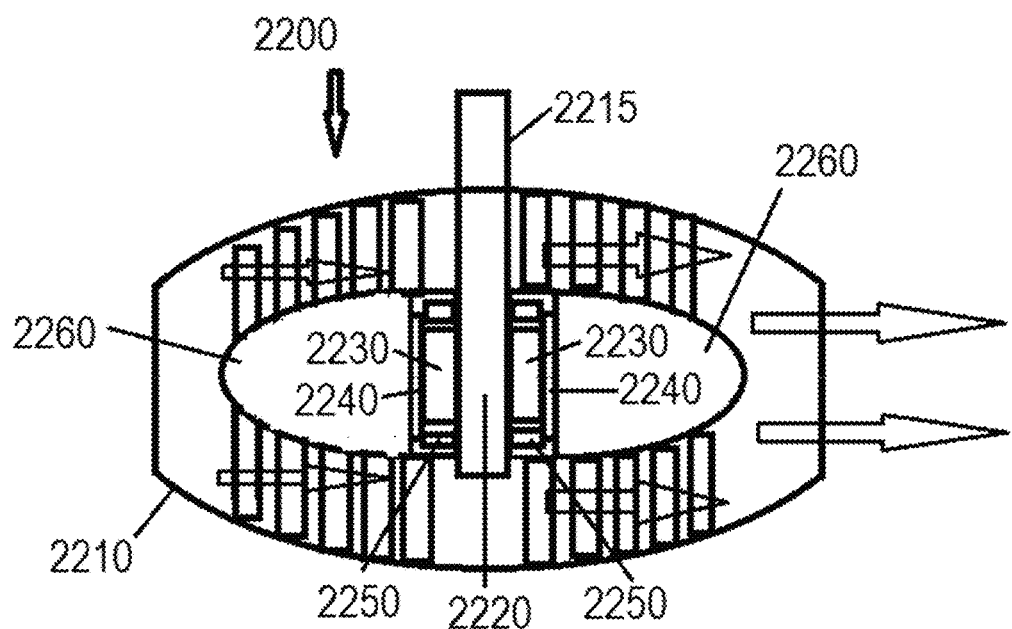
FIG. 22 is a cross sectional view of the embodiment of FIG. 14 with two islands as a turbine engine.

In a further embodiment, as illustrated in FIG. 22, an exemplary engine 2200 as described herein is provided with turbine-type blades attached to and extending outwardly from the casing 2260, wherein the assembly is disposed within a nacelle 2210. The rear side plate of the engine 2220 is attached to the airframe of the aircraft or other vehicle or mounting 2215, as desired. The rear side plate 2220 is attached to two stationary islands 2230, which in turn are attached to two stationary front plates 2240, wherein contours 2250 are located between the islands, front and back side plates, and the casing 2260. A flow path is defined between the inner surface of the nacelle and the outer surface of the engine casing, through the blades. Thrust is generated when the engine is operated and the blades are spinning, which is directed out the back of the nacelle to generate thrust. The arrangement can be modified for marine applications wherein the vanes are impeller blades for directing water through the nacelle. FIGS. 23A-B illustrate an embodiment of a turbine engine using the engine embodiment of FIG. 1, including two islands attached to a hollow central shaft as well as to a plurality of annularly shaped turbine rotor rings having turbine blades integral therewith or removably attached such as via dovetail connection between the rotor ring and base of the turbine blades.

Although the present disclosure herein has been described with reference to particular preferred embodiments thereof, it is to be understood that these embodiments are merely illustrative of the principles and applications of the disclosure. Therefore, modifications may be made to these embodiments and other arrangements may be devised without departing from the spirit and scope of the disclosure.

What is claimed is:

1. A rotary machine, comprising:
    a) a rotatable casing defining a central axis (A), the casing defining a cavity therein;
    b) a stationary first island disposed in the cavity of the rotatable casing, the stationary first island having a body with a volume generally defined between front and rear surfaces that are spaced apart, the front and rear surfaces lying in a plane parallel to a radial axis (R), the front and rear surfaces having a rounded, non-circular shape, wherein respective perimeters of the front and rear surfaces define a curved perimeter surface therebetween, the stationary first island defining a first set of fluid passages therethrough for passing a working fluid therethrough, a second set of fluid passages for passing a coolant therethrough, and a third set of fluid passages therethrough for passing a lubricant therethrough;
    c) a stationary front side plate disposed adjacent to the front surface of the stationary first island;
    d) a stationary rear side plate disposed adjacent to the rear surface of the stationary first island, the stationary rear side plate defining a plurality of ports passing therethrough in fluid communication with the first and second sets of fluid passages; and
    e) a first contour assembly disposed between the front side plate and the rear side plate, the first contour assembly being attached to the casing proximate an outer region thereof, the first contour assembly being defined by a pair of opposed outwardly facing arcuately shaped front and rear surfaces that are connected by a concave inwardly facing surface, the concave inwardly facing surface of the contour assembly facing the curved perimeter surface of the stationary first island, the concave inwardly facing surface and the curved perimeter surface of the stationary first island and the front side plate and rear side plate cooperating to form a working volume, the casing and first contour assembly being configured to rotate about the axis (A) with respect to the stationary first island.

2. The rotary machine of claim 1, further comprising a central crankshaft having a central axis coincident with the axis (A), the central crankshaft being attached to a front plate of the casing.

3. The rotary machine of claim 1, further comprising a power take off mechanism attached to an outer periphery of the casing.

4. The rotary machine of claim 3, wherein the power take off mechanism includes a plurality of permanent magnets attached to the outer periphery of the casing, and further wherein the rotary machine is disposed within a bore of a stator of an electric generator, wherein rotational energy of the casing is converted into electrical power when the casing rotates with respect to the stator.

5. The rotary machine of claim 3, wherein the power take off mechanism includes a plurality of vanes extending outwardly from the outer periphery of the casing, and further wherein at least one of the front side plate, stationary first island and the back side plate of the rotary machine are configurable to be attached to an airframe of an aircraft, wherein rotational energy of the casing is converted into thrust generated by the plurality of vanes when the casing rotates with respect to the stator.

6. The rotary machine of claim 5, wherein the plurality of vanes are propeller blades.

7. The rotary machine of claim 5, wherein the plurality of vanes are turbine blades.

8. The rotary machine of claim 5, wherein the plurality of vanes are impeller blades.

9. The rotary machine of claim 1, further comprising a power take off mechanism including a plurality of vanes extending outwardly from a ring structure attached to a main shaft, wherein the rotary machine is configurable to be attached to an airframe of an aircraft, wherein rotational energy of the vanes is converted into thrust generated by the plurality of vanes when the main shaft rotates.

10. The rotary machine of claim 9, wherein the plurality of vanes are propeller blades.

11. The rotary machine of claim 9, wherein the plurality of vanes are turbine blades.

12. The rotary machine of claim 9, wherein the plurality of vanes are impeller blades.

13. A rotary machine, comprising:
a) a rotatable casing defining a central axis (A), the casing defining a cavity therein;
b) a stationary first island disposed in the cavity of the rotatable casing, the stationary first island having a body with a volume generally defined between front and rear surfaces that are spaced apart, the front and rear surfaces lying in a plane parallel to a radial axis (R), the front and rear surfaces having a rounded, non-circular shape, wherein respective perimeters of the front and rear surfaces define a curved perimeter surface therebetween, the stationary first island defining a first set of fluid passages therethrough for passing a working fluid therethrough, and a second set of fluid passages for passing a coolant therethrough;
c) a stationary front side plate disposed adjacent to the front surface of the stationary first island;
d) a stationary rear side plate disposed adjacent to the rear surface of the stationary first island, the stationary rear side plate defining a plurality of ports passing therethrough in fluid communication with the first and second sets of fluid passages;
e) a first contour assembly disposed between the front side plate and the rear side plate, the first contour assembly being attached to the casing proximate an outer region thereof, the first contour assembly being defined by a pair of opposed outwardly facing arcuately shaped front and rear surfaces that are connected by a concave inwardly facing surface, the concave inwardly facing surface of the contour assembly facing the curved perimeter surface of the stationary first island, the concave inwardly facing surface and the curved perimeter surface of the stationary first island and the front side plate and rear side plate cooperating to form a working volume, the casing and first contour assembly being configured to rotate about the axis (A) with respect to the stationary first island; and f) a power take off mechanism attached to an outer periphery of the casing, wherein the power take off mechanism includes a plurality of vanes extending outwardly from the outer periphery of the casing, and further wherein at least one of the front side plate, stationary first island and the back side plate of the rotary machine are configurable to be attached to an airframe of an aircraft, and wherein rotational energy of the casing is converted into thrust generated by the plurality of vanes when the casing rotates with respect to the stator.

14. The rotary machine of claim 13, wherein the plurality of vanes are propeller blades.

15. The rotary machine of claim 13, wherein the plurality of vanes are turbine blades.

16. The rotary machine of claim 13, wherein the plurality of vanes are impeller blades.

17. The rotary machine of claim 13, further comprising a central crankshaft having a central axis coincident with the axis (A), the central crankshaft being attached to a front plate of the casing.

18. A rotary machine, comprising:
a) a rotatable shaft defining a central axis (A}, the rotatable shaft having a first end and a second end, the rotatable shaft having a stationary first island disposed thereon, the stationary first island having a body with a volume generally defined between front and rear surfaces that are spaced apart along the rotatable shaft, the front and rear surfaces lying in a plane parallel to a radial axis (R}, the front and rear surfaces having a rounded, non-circular shape, wherein respective perimeters of the front and rear surfaces define a curved perimeter surface therebetween, the stationary first island defining a plurality of valve cavities therein for receiving rotatable valves;
b) a front side plate disposed adjacent to the front surface of the stationary first island;
c) a rear side plate disposed adjacent to the rear surface of the stationary first island;
d) a first contour assembly disposed between the front side plate and the rear side plate, the first contour assembly being defined by a pair of opposed outwardly facing arcuately shaped front and rear surfaces that are connected by a concave inwardly facing surface, the concave inwardly facing surface of the contour assembly facing the curved perimeter surface of the stationary first island, the concave inwardly facing surface and the curved perimeter surface of the stationary island and the front side plate and rear side plate cooperating to form a working volume, the rotatable shaft and stationary first island being configured to rotate with respect to the first contour assembly; and
e) a plurality of rotatable valves disposed in the valve cavities defined in the stationary first island, the rotatable valves being configured to rotate within the valve cavities when the stationary first island rotates with respect to the first contour assembly about the central axis; and
f) a power take off mechanism including a plurality of vanes extending outwardly from a ring structure attached to the rotatable shaft, wherein the rotary machine is configurable to be attached to an airframe of an aircraft, wherein rotational energy of the vanes is converted into thrust generated by the plurality of vanes when the rotatable shaft rotates.

19. The rotary machine of claim 18, wherein the plurality of vanes are propeller blades.

20. The rotary machine of claim 18, wherein the plurality of vanes are turbine blades.

21. The rotary machine of claim 18, further comprising a central crankshaft having a central axis coincident with the axis (A), the central crankshaft being attached to a front plate of the casing.

22. The rotary machine of claim 18, wherein the plurality of vanes are impeller blades.

* * * * *